United States Patent
Suzuki et al.

(10) Patent No.: US 10,360,706 B2
(45) Date of Patent: Jul. 23, 2019

(54) DEVICE METHOD AND PROGRAM FOR ADJUSTING A DISPLAY STATE OF A SUPERIMPOSED IMAGE

(71) Applicant: Sony Corporation, Tokyo (JP)

(72) Inventors: Seiji Suzuki, Kanagawa (JP); Reiko Miyazaki, Tokyo (JP); Yasuyuki Koga, Kanagawa (JP); Takuo Ikeda, Tokyo (JP)

(73) Assignee: Sony Corporation (JP)

( * ) Notice: Subject to any disclaimer, the term of this patent is extended or adjusted under 35 U.S.C. 154(b) by 333 days.

(21) Appl. No.: 14/401,301

(22) PCT Filed: Mar. 22, 2013

(86) PCT No.: PCT/JP2013/058326
§ 371 (c)(1),
(2) Date: Nov. 14, 2014

(87) PCT Pub. No.: WO2013/175847
PCT Pub. Date: Nov. 28, 2013

(65) Prior Publication Data
US 2015/0123994 A1    May 7, 2015

(30) Foreign Application Priority Data

May 22, 2012    (JP) ................................. 2012-116586

(51) Int. Cl.
*G06F 3/01*    (2006.01)
*G06F 9/00*    (2006.01)
(Continued)

(52) U.S. Cl.
CPC ............... *G06T 11/60* (2013.01); *G06F 3/01* (2013.01); *G06F 3/011* (2013.01); *G06F 3/017* (2013.01);
(Continued)

(58) Field of Classification Search
None
See application file for complete search history.

(56) References Cited

U.S. PATENT DOCUMENTS 5,515,130 A * 5/1996 Tsukahara ............... G02B 7/28
                                                                 396/121
8,872,760 B2  10/2014 Tsurumi
(Continued)

FOREIGN PATENT DOCUMENTS

CN    102317888 A    1/2012
JP    199585303      3/1995
(Continued)

OTHER PUBLICATIONS

Japanese Office Action for JP-2014516698 dated Jan. 26, 2016; machine translation.
(Continued)

*Primary Examiner* — Kee M Tung
*Assistant Examiner* — Yanna Wu
(74) *Attorney, Agent, or Firm* — Lerner, David, Littenberg, Krumholz & Mentlik, LLP

(57) ABSTRACT

There is provided an image processing device including a control section configured to execute control to generate a superimposed image by superimposing on a background image a human body image that depicts at least a part of a human body and moves in response to gestural operation of a user, in order to display the superimposed image, while adjusting a display state of the superimposed image.

9 Claims, 19 Drawing Sheets

(51) Int. Cl.
| | | |
|---|---|---|
| *G06F 3/042* | (2006.01) | |
| *G06F 3/048* | (2013.01) | |
| *G06T 11/60* | (2006.01) | |
| *H04N 5/272* | (2006.01) | |
| *G06F 3/0484* | (2013.01) | |
| *G06F 3/0488* | (2013.01) | |
| *G06K 9/00* | (2006.01) | |

(52) U.S. Cl.
CPC .......... *G06F 3/048* (2013.01); *G06F 3/04883* (2013.01); *G06K 9/00355* (2013.01); *H04N 5/272* (2013.01); *G06F 3/013* (2013.01); *G06F 3/0425* (2013.01); *G06F 3/04842* (2013.01); *G06F 2203/04806* (2013.01)

(56) References Cited

U.S. PATENT DOCUMENTS

| | | | |
|---|---|---|---|
| 2005/0151850 A1 | 7/2005 | Ahn et al. | |
| 2009/0228841 A1* | 9/2009 | Hildreth | G06F 3/0304 715/863 |
| 2011/0107216 A1* | 5/2011 | Bi | G06F 3/011 715/716 |
| 2011/0119640 A1 | 5/2011 | Berkes et al. | |
| 2011/0302535 A1* | 12/2011 | Clerc | G06F 3/017 715/848 |
| 2012/0206577 A1* | 8/2012 | Guckenberger | G09B 19/003 348/47 |
| 2012/0270654 A1* | 10/2012 | Padovani | G06F 3/011 463/36 |
| 2014/0149376 A1* | 5/2014 | Kutaragi | G06K 9/4676 707/706 |
| 2015/0035772 A1* | 2/2015 | Asahara | B63B 49/00 345/173 |

FOREIGN PATENT DOCUMENTS

| | | |
|---|---|---|
| JP | 2007156922 A | 6/2007 |
| JP | 2010257093 A | 11/2010 |
| JP | 2010541398 A | 12/2010 |
| JP | 4670860 B2 | 4/2011 |
| JP | 2012-018620 A | 1/2012 |
| WO | 2009035705 A1 | 3/2009 |
| WO | 2010095191 A1 | 8/2010 |
| WO | 2011153078 A2 | 12/2011 |
| WO | 2012046432 A1 | 4/2012 |

OTHER PUBLICATIONS

Chinese Office Action for Application No. 201380025417.7 dated Jul. 29, 2016.
International Search Report from International Publication No. PCT/JP2013/058326 dated May 28, 2013.
Japanese Office Action for JP Application No. 2014516698, dated Nov. 4, 2015.
Kiyama, et. al., Evaluation of an Effect that the Deformation of the Avatar has on the Body Sensation, IEICE Technical Report, pp. 35-40, 2011 (with English language Abstract only).
Supplementary European Search Report for EP 13 79 3803, dated Dec. 4, 2015.

* cited by examiner

DEVICE METHOD AND PROGRAM FOR ADJUSTING A DISPLAY STATE OF A SUPERIMPOSED IMAGE

CROSS-REFERENCE TO RELATED APPLICATION

The present application is a national phase entry under 35 U.S.C. § 371 of International Application No. PCT/JP2013/058326 filed Mar. 22, 2013, published on Nov. 28, 2013 as WO 2013/175847 A1, which claims priority from Japanese Patent Application No. JP 2012-116586, filed in the Japanese Patent Office on May 22, 2012.

TECHNICAL FIELD

The present disclosure relates to an image processing device, an image processing method, and a program.

BACKGROUND ART

Patent Literature 1 discloses a technology that displays a superimposed image in which a palm image depicting a palm of a user is superimposed on a background image, and moves the palm image in response to gestural operation of the user (movement of the palm). The user performs input operation using the palm image.

CITATION LIST

Patent Literature

Patent Literature 1: JP 4670860B

SUMMARY OF INVENTION

Technical Problem

However, the technology disclosed in Patent Literature 1 does not adjust at all the display state of the superimposed image (for example, the display magnification of the palm image, and the like). For this reason, the operability was not good. Therefore, there is a need for the technology capable of improving the operability of the human body image (for example, the palm image).

Solution to Problem

According to the present disclosure, there is provided an image processing device including a control section configured to execute control to generate a superimposed image by superimposing on a background image a human body image that depicts at least a part of a human body and moves in response to gestural operation of a user, in order to display the superimposed image, while adjusting a display state of the superimposed image.

According to the present disclosure, there is provided an image processing method including executing control to generate a superimposed image by superimposing on a background image a human body image that depicts at least a part of a human body and moves in response to gestural operation of a user, in order to display the superimposed image, while adjusting the superimposed image.

According to the present disclosure, there is provided a program for causing a computer to implement a control function to execute control to generate a superimposed image by superimposing on a background image a human body image that depicts at least a part of a human body and moves in response to gestural operation of a user, in order to display the superimposed image, while adjusting the superimposed image.

According to the present disclosure, the image processing device and the like can adjust the display state of the superimposed image.

Advantageous Effects of Invention

As described above, according to the present disclosure, the image processing device and the like can adjust the display state of the superimposed image, to improve the operability of the human body image.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted.

Note that description will be made in the following order.
1. Study on Large Screen Display
2. Configuration of Information Processing System
   2-1. Overall Configuration
   2-2. Configuration of Large Screen Display
   2-3. Configuration of Server (Image Processing Device)
3. Procedure of Process by Information Processing System <1. Study on Large Screen Display>

The present inventors have come to devise the image processing system according to the present embodiment, by conducting the study on the large screen display. Therefore, first, description will be made of the study that the present inventors have conducted.

Figure 6:
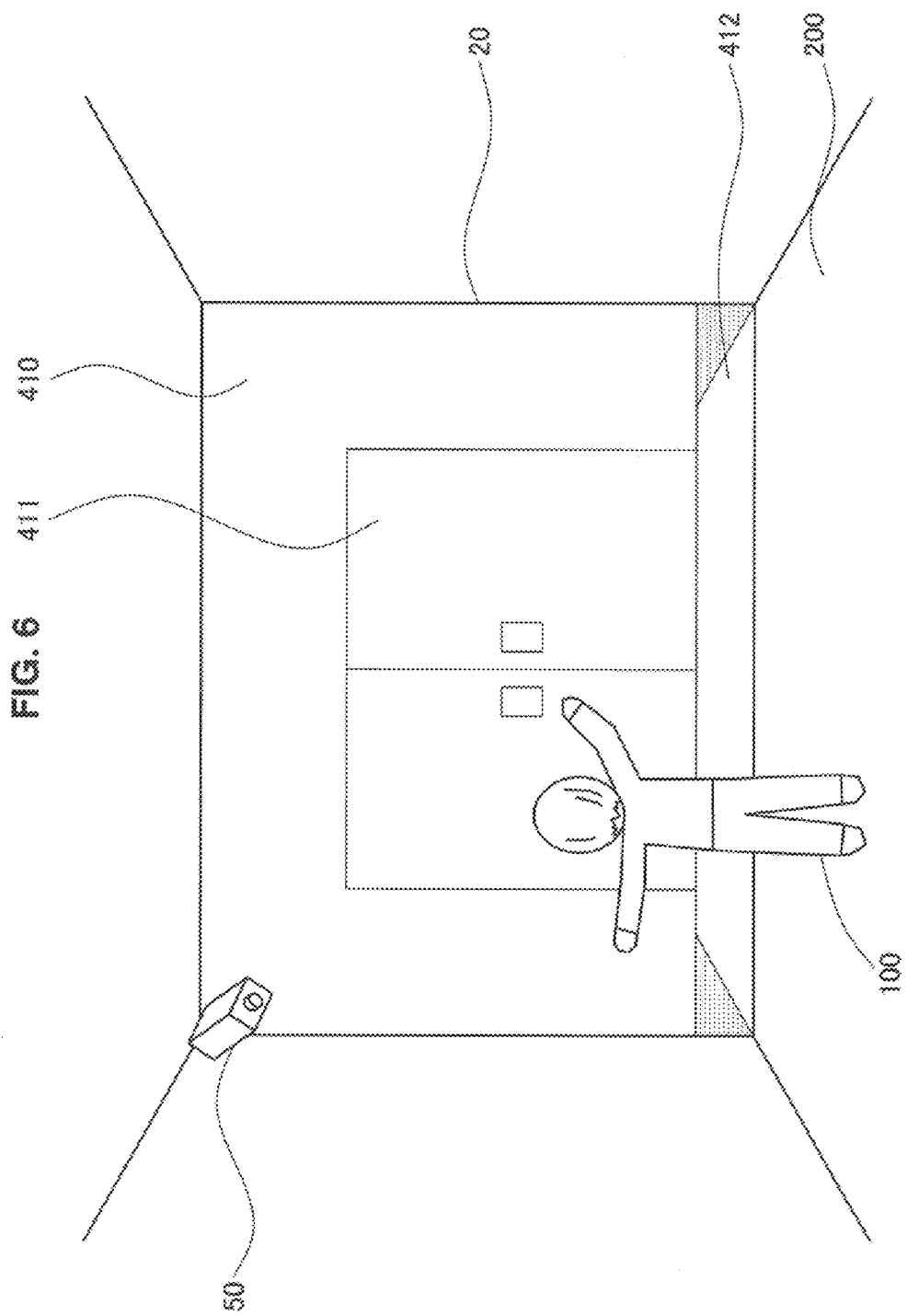
FIG. 6 is an explanatory diagram illustrating an example of a display screen image that the display device displays.

FIG. 6 illustrates an example of the large screen display 20. In FIG. 6, the overall wall surface of a room 200 is the large screen display 20. As a matter of course, the large screen display 20 is not limited to this example, but a part of the wall may be the display, for example. Also, the display may be separate from the wall.

In this way, the large screen display 20 can be an interior of the room 200. By displaying some image on the large screen display 20, the user 100 is expected to have a sense as if the user is present in the image. For example, when a shot image of skyscrapers from the sky is displayed on the large screen display 20, the user 100 has a sense as if viewing skyscrapers from the sky. Also, when an image depicting a ground surface and the floor of the room 200 on the same plane is displayed on the large screen display 20, the user 100 has a sense that the floor of the room 200 connects to the ground surface continuously.

Also, when a shot image of the inside of a store is displayed on the large screen display 20, the user 100 has a sense that the user is shopping in the store. Also, when a living room in which a display and others are installed is displayed on the large screen display 20, the user 100 has a sense that there is another additional living room next to the room 200. Also, by displaying a painting and others on the large screen display 20, the user 100 has a sense that the painting is hanging on the wall. In this way, the large screen display 20 is expected to have an application as a device for implementing virtual reality, for example.

On the other hand, as a device with which the user 100 selects an object displayed on the display, a cursor pointing device, a touch sensing pointing device, and a ray casting pointing device are proposed.

The cursor pointing device is, for example, a device such as a mouse. When the cursor pointing device is applied to the large screen display 20, the user 100 needs to operate a mouse a number of times, in order to move the cursor to a target position. It is because the movement amount of the cursor by one operation of the mouse is very little compared to the size of the large screen display 20. For this reason, the user 100 naturally needs effort and time for the operation.

As a technology for reducing the effort and time taken for the operation, one can conceive of making the moving speed of the cursor in the large screen display 20 higher than the moving speed of the device. However, in this technology, the user 100 cannot predict easily how much the cursor moves relative to the actual moving speed of the device. For this reason, even when this technology is applied to the large screen display 20, the user 100 takes effort and time to set the cursor at a target position. Also, the input operation using the cursor pointing device is not intuitive for the user 100.

The touch sensing pointing device is, for example, a device such as a touch panel. When the touch sensing pointing device is applied to the large screen display 20, the user 100 needs to walk to move left and right in order to touch a target position. Further, when the large screen display 20 is large vertically relative to the height of the user 100, there is a region unreachable. Further, because the user 100 has to be near the screen to touch the target position, the user 100 cannot get a perspective view of the large screen from a far place, The ray casting pointing device is, for example, a device such as a remote control type controller of a game machine. The ray casting pointing device cannot achieve sufficient accuracy in the large screen display 20. Also, the user 100 has to hold the device in his or her hand. Also, the user 100 cannot get close to the large screen display 20.

Accordingly, in each device described above, the operability is not good, and the operation is not intuitive. In contrast, with regard to the technology disclosed in Patent Literature 1, there is disclosed a technology that displays a superimposed image in which a palm image depicting a palm of a user 100 is superimposed on a background image, and moves the palm image in response to gestural operation of the user 100 (movement of the palm). The user 100 conducts input operation using the palm image. In Patent Literature 1, the user 100 can perform an intuitive operation.

However, since the technology disclosed in Patent Literature 1 is applied to a portable device such as a PDA and a digital camera, the large screen display 20 is not considered at all. Further, the technology disclosed in Patent Literature 1 does not adjust at all the display state of the superimposed image (for example, the display magnification of the palm image, and the like). For this reason, the operability of the palm image is not good.

Specifically, when the technology disclosed in Patent Literature 1 is applied to the large screen display 20, the palm image is displayed on the large screen display 20, and the large screen display 20 is very big relative to the palm image. Also, the range within which the user 100 can move the palm is limited. In contrast, since the technology disclosed in Patent Literature 1 merely moves the palm image in response to the palm of the user 100, the region that the palm image does not reach is generated. That is, since Patent Literature 1 is based on the premise of a portable device such as a PDA and a digital camera, i.e., is based on the premise that the palm image reaches each region of the display screen, the region that the palm image does not reach is not considered at all. Accordingly, when the technology disclosed in Patent Literature 1 is applied to the large screen display 20, the operability of the palm image is not good.

In contrast, the image processing system 10 according to the present embodiment adjusts the display state of at least one of the human body image and the background image, in order to achieve an improvement of the operability of the human body image.

<2. Configuration of Information Processing System>

[2-1. Overall Configuration]

Figure 1:
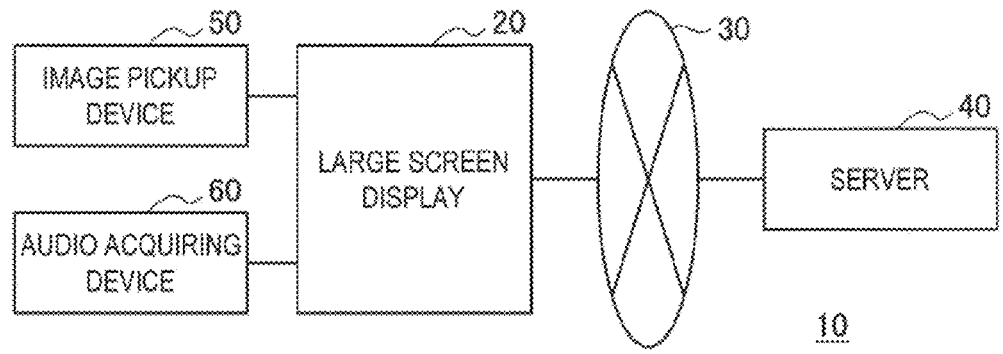
FIG. 1 is a block diagram illustrating a configuration of an image processing system according to an embodiment of the present disclosure.

Next, on the basis of FIG. 1, description will be made of the overall configuration of the image processing system 10. The image processing system 10 includes a large screen display 20, a communication network 30, a server 40, an image pickup device 50, and an audio acquiring device 60. Note that the audio acquiring device 60 may not be included.

As illustrated in FIG. 6, the large screen display 20 makes up the overall wall surface of the room 200, for example. The communication network 30 interconnects the large screen display 20 and the server 40. The server 40 generates a superimposed image (an image in which a human body image is superimposed on a background image) to be displayed on the large screen display 20. Accordingly, the present embodiment is based on the premise of what is called the cloud computing service. As a matter of course, the display device may generate and display the superimposed image.

The image pickup device 50 is, for example, a video camera, and as illustrated in FIG. 6, is provided on the ceiling of the room 200. The image pickup device 50 takes a picture of the user 100, and outputs the resulting shot image to the large screen display 20. The audio acquiring device 60 is, for example, a headset microphone, and is worn on the head of the user 100. The audio acquiring device 60 acquires the sound of the user 100, and outputs the resulting audio information to the large screen display 20.

[2-2. Configuration of Large Screen Display]

Figure 2:
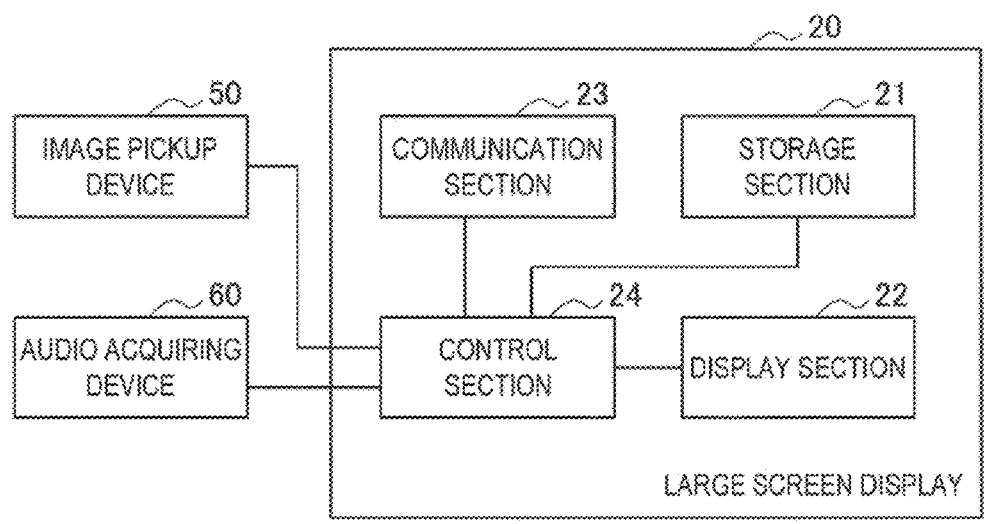
FIG. 2 is a block diagram illustrating a configuration of a display device according to the same embodiment.

Next, on the basis of FIG. 2, description will be made of the configuration of the large screen display 20. The large screen display 20 includes a storage section 21, a display section 22, a communication section 23, and a control section 24. The large screen display 20 has a hardware configuration such as a CPU, a ROM, a RAM, a hard disk, a display panel, and a communication device. The ROM stores programs for causing the large screen display 20 to implement the storage section 21, the display section 22, the communication section 23, and the control section 24. The CPU reads and carries out the programs stored in the ROM. Accordingly, by these hardware configuration, the storage section 21, the display section 22, the communication section 23, and the control section 24 are implemented.

The storage section 21 stores the programs and the like described above. The display section 22 displays various types of screen images. The communication section 23 communicates with the server 40 via the communication network 30. The control section 24 controls each component of the large screen display 20, and executes the following processes. That is, the control section 24 outputs the shot image provided from the image pickup device 50, and the audio information provided from the audio acquiring device 60, to the communication section 23. The communication section 23 transmits the shot image and the audio information to the server 40. On the other hand, the communication section 23 receives the superimposed image transmitted from the server 40, and outputs the superimposed image to the control section 24. The control section 24 displays the superimposed image on the display section 22.

[2-3. Configuration of Server]

Figure 3:
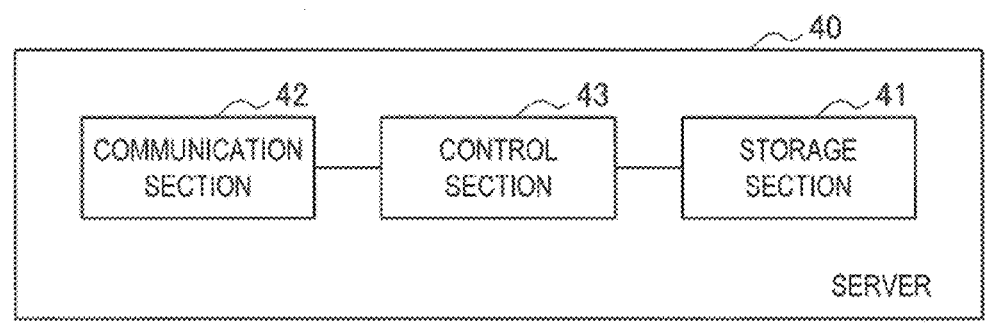
FIG. 3 is a block diagram illustrating a configuration of a server.

Next, on the basis of FIG. 3, description will be made of the configuration of the server 40. The server 40 includes a storage section 41, a communication section 42, and a control section 43. The server 40 has a hardware configuration such as a CPU, a ROM, a RAM, a hard disk, and a communication device. The ROM stores programs for causing the server 40 to implement the storage section 41, the communication section 42, and the control section 43. The CPU reads and carries out the programs stored in the ROM. Accordingly, by these hardware configuration, the storage section 41, the communication section 42, and the control section 43 are implemented.

The storage section 41 stores background images and others, in addition to the programs described above. This background image is, for example, a shot image of skyscrapers from the sky, an image depicting a ground surface, an image of the inside of a store, an image depicting a living room, an image depicting a painting, and the like. The communication section 42 communicates with the large screen display 20 via the communication network 30. The control section 43 executes the following processes, as well as controls each component of the server 40. That is, the control section 43 extracts an image depicting the user 100, i.e., a human body image, from the shot image. Then, the control section 43 generates the mirror image by rendering the human body image semi-transparent (semi-transmissive). Accordingly, the mirror image is an example of the image that depicts at least a part of the human body and moves in response to the gestural operation of the user 100 (i.e., the human body image).

Here, several variant examples of the mirror image will be described. For example, the control section 43 may generate the mirror image, by blacking out the human body image and rendering this semi-transparent. Also, the control section 43 may extract the silhouette of the human body image, and set this as the mirror image. Also, the control section 41 may execute processes such as scaling, translation, distortion, and defocusing on the mirror image generated by these processes, and thereafter superimpose the mirror image on the background image which is described below. Also, the mirror image may depict all of the human body, and may depict a part of the human body (for example, only an upper body, only a palm, and the like).

Further, the control section 43 acquires the background image from the storage section 41. The control section 43 may detect the gestural operation of the user 100 on the basis of the human body image and the audio information, and scroll the background image on the basis of the gestural operation of the user 100. For example, when the user 100 stamps his or her feet, the control section 43 scrolls the background image in the screen depth direction. Note that, in the present embodiment, the speaking of the user 100 is also the gestural operation.

Then, the control section 43 superimposes the mirror image on the background image, to generate the superimposed image. Also, the control section 43 detects the gestural operation of the user 100 on the basis of the human body image and the audio information, and adjusts the superimposed image on the basis of the gestural operation. For example, the control section 43 selects a part of the background image as a selected region on the basis of the gestural operation of the user 100, and executes the processes such as enlargement of the selected region. The control section 43 outputs the superimposed image to the communication section 42, and the communication section 42 transmits the superimposed image to the large screen display 20.

<3. Procedure of Process by Information Processing System>

Next, description will be made of the procedure of the process by the image processing system 10, with an example in which the image processing system 10 displays an image of the inside of a store (in this case, a book store). In this example, the user 100 can have the same experience as shopping in the store actually. That is, the user 100 can enjoy a virtual shopping. Note that, in the following process, the large screen display 20 transmits the shot image and the audio information to the server 40 on a constant basis.

First, as illustrated in FIG. 6, the control section 43 of the server 40 displays the background image 410 depicting the entrance 411 of the store and the ground surface 412 on the large screen display 20. Here, the ground surface 412 is depicted on the same plane as the floor of the room 200, and the entrance 411 is located on the ground surface 412. Accordingly, the user 100 has a sense as if the entrance 411 and the ground surface 412 connect to the floor of the room 200 continuously.

Thereafter, the user 100 performs the gesture of stamping his or her feet, for example. On the other hand, the control section 43 detects the gesture of stamping his or her feet, and scrolls the background image 410 in the screen depth direction. Then, when the entrance 411 reaches the display surface of the large screen display 20 the control section 43, the control section 43 displays the background image in which the entrance 411 opens.

Figure 7:
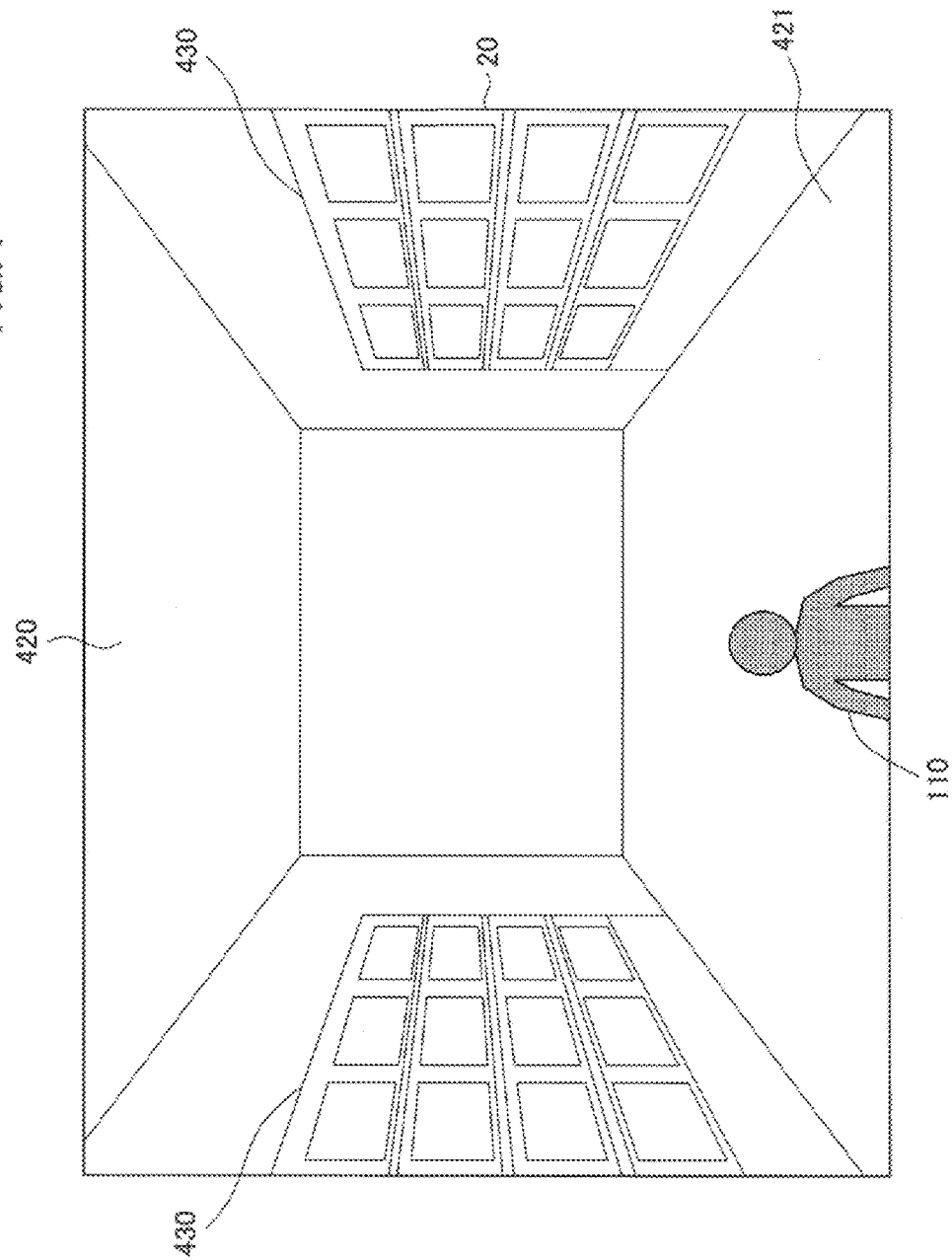
FIG. 7 is an explanatory diagram illustrating an example of a display screen image that the display device displays.

Thereafter, the control section 43 generates the background image depicting the inside of the store. Further, the control section 43 generates the silhouette image by blacking out the human body image, and projects the silhouette image on the ground surface part of the background image. Then, the control section 43 displays the generated background image on the large screen display 20. FIG. 7 illustrates an example. In the following, the image of the inside of the store as illustrated in FIG. 7 is referred to as a normal store image as well. In this example the control section 43 displays the background image 420 on the large screen display 20. In the background image 420, a silhouette image 110, a bookshelf 430, and a ground surface 421 are depicted. The ground surface 421 is located on the same plane as the floor of the room 200. Accordingly, the user 100 has a sense as if strolling in the store actually.

After that, the control section 43 scrolls the background image on the basis of the gestural operation of the user 100. For example, when the user 100 performs the gesture of stamping his or her feet, the control section 43 scrolls the background image in the screen depth direction. Also, when the user 100 rotates in the horizontal direction, the control section 43 rotates the background image in the rotation direction (i.e., changes the forward direction of the user 100 in the background image).

Figure 4:
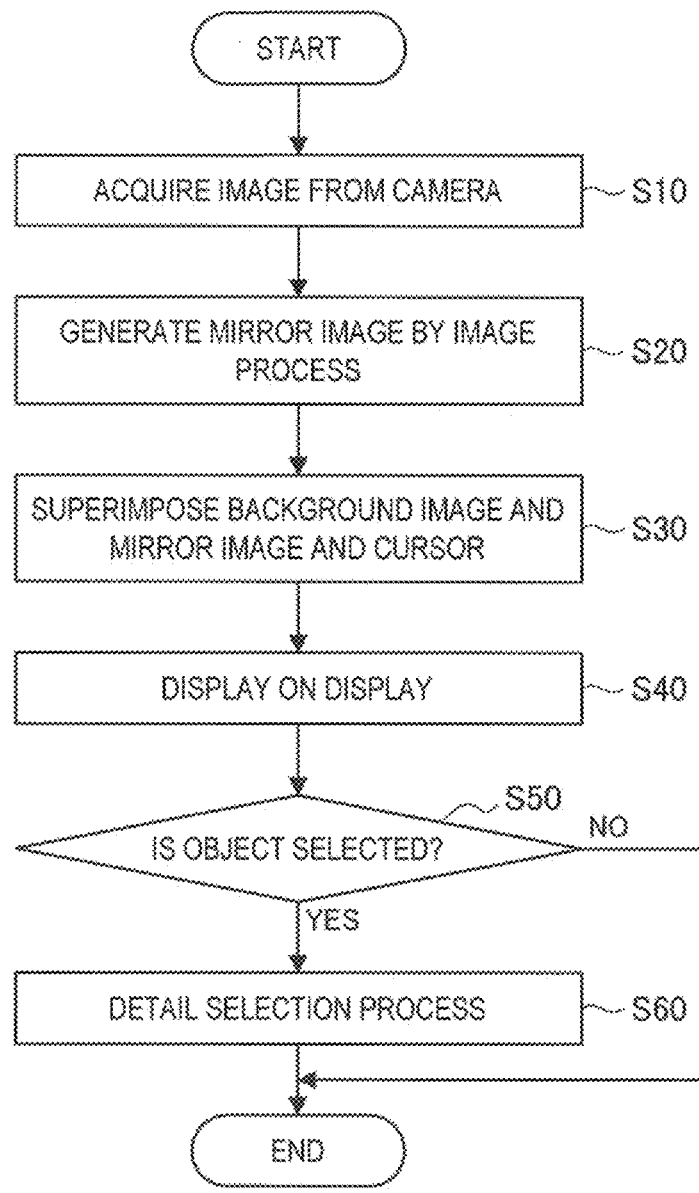
FIG. 4 is a flowchart illustrating a procedure of a process by the image processing system.

Then, when the user 100 opposes the bookshelf 430, the control section 43 executes the process in accordance with the flowchart illustrated in FIG. 4. In step S10, the control section 43 acquires the shot image. In step S20, the control section 43 detects the human body image from the shot image, and generates the mirror image described above, on the basis of the human body image. In step S30, the control section 43 generates the superimposed image by superimposing the mirror image on the background image. Further, the control section 43 superimposes a cursor on the palm image of the mirror image. In step S40, the control section 43 displays the superimposed image on the large screen display 20. Although the mirror image is located at front of the background image as viewed from the user 100, since the mirror image is semi-transparent, the user 100 can view and confirm the background image at the back of the mirror image.

Figure 8:
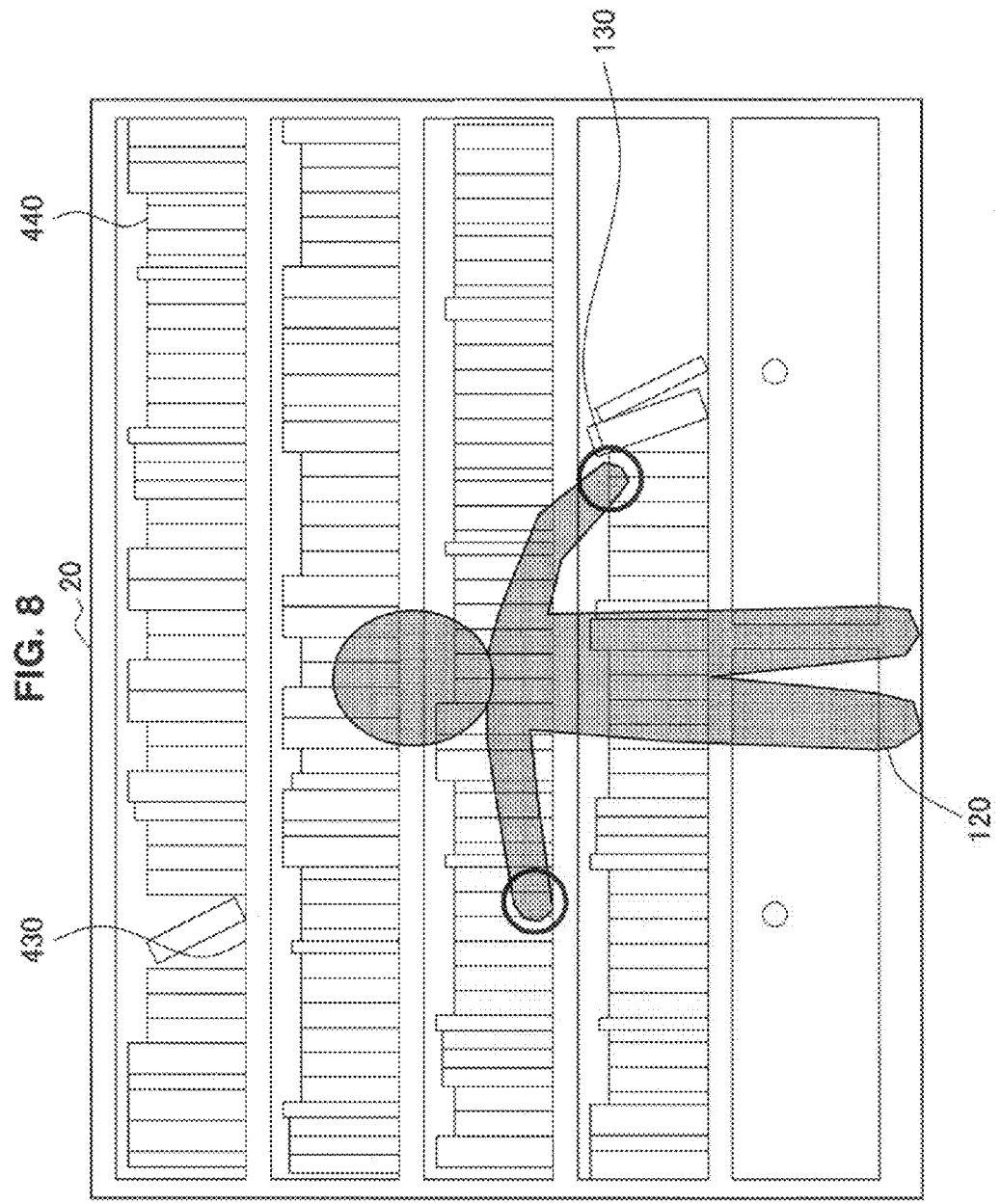
FIG. 8 is an explanatory diagram illustrating an example of a display screen image that the display device displays.

FIG. 8 illustrates an example of the superimposed image. In this example, the user 100 opposes the bookshelf 430. That is, the bookshelf 430 is depicted on almost all the surface of the background image. In the bookshelf 430, a plurality of books 440 are located. Also, the mirror image 120 is superimposed at the center portion, with respect to the horizontal direction, of the background image. The cursor 130 is superimposed on the palm image in the mirror image 120. The control section 43 moves the mirror image 120 in response to the gestural operation of the user 100. That is, the mirror image 120 moves in the same way as the user 100. Also, the control section 43 causes the cursor 130 to follow the movement of the palm image. Accordingly, the user 100 moves the palm of his or her own, to move the cursor 130 to a target position (for example, the position at which the target book 440 is located).

Note that the control section 43 may display an animation in which the silhouette image described above rises up along the bookshelf 430, and after that, change the silhouette image to the mirror image. Thereby, the user 100 can easily understand that the silhouette image is transformed into the mirror image. Also, the control section 43 may not display the mirror image 120, when the object in the bookshelf 430 (i.e., the book 440) is what the user 100 is not allowed to select (for example, an article not for sale). Thereby, the user 100 can easily understand that the book 440 in the bookshelf 430 is not allowed to select. Also, in an example of FIG. 8, the cursors 130 are superimposed on the both palm images, but may be superimposed on one palm image only. Also, the cursor 130 may be superimposed on a part other than the palm image, for example, on the image of the fingertip of the foot.

In this way, the large screen display 20 displays the mirror image that moves in response to the gestural operation of the user 100, and superimposes the cursor 130 on the palm image of the mirror image. For this reason, the user 100 can easily predict the moving speed of the cursor 130 on the basis of the movement of the mirror image. Accordingly, the image processing system 10 can improve the operability of the cursor 130. Also, since the user 100 moves his or her own body (particularly, the palm image) to move the cursor 130, the cursor 130 is intuitively operated.

In step S50, the control section 43 determines whether or not the user 100 has selected any object (in this case, the book 440) on the basis of the human body image extracted from the shot image. Note that the control section 43 determines that the user 100 has selected an object, when the user 100 performs the gesture for holding an object, for example. If the control section 43 determines that the user 100 has selected any object, the control section 43 proceeds to step S60. If the control section 43 determines that the user 100 has not selected an object, the control section 43 ends the present process. In step S60, the control section 64 executes the detail selection process. The detail selection process is described below.

Note that the control section 43 sets the moving speed of the palm image of the mirror image 120 (i.e., the moving speed of the cursor 130) equal to the moving speed of the palm of the user 100. This is to allow the user 100 to easily predict the moving speed of the cursor 130. However, in this process, since the movement range of the cursor 130 is identical with the movement range of the palm image of the mirror image 120, the region which the cursor 130 does not reach is generated. That is, the user 100 cannot select the object outside the movement range of the palm image of the mirror image 120, from among the objects displayed on the large screen display 20. Since the user 100 needs to perform the gestural operation such as moving left and right to select these objects, selecting these objects takes effort.

As a method to move the cursor 130 to every region of the large screen display 20, separating the cursor 130 from the mirror image 120 and moving the cursor 130 faster (longer) than the palm of the user 100 can be conceived of, for example. In this method, for example, when the user 100 moves the palm 5 cm, the cursor 130 moves 20 cm, for example. However, in this process, the user 100 has a difficulty in selecting minute objects. Also, the user 100 cannot predict easily the moving speed of the cursor 130.

On the other hand, as a method to make it easy for the user 100 to select minute objects, separating the cursor 130 from the mirror image 120 and moving the cursor 130 slower (shorter) than the palm of the user 100 can be conceived of, for example. In this method, for example, when the user 100 moves the palm 5 cm, the cursor 130 moves 1 cm, for example. However, in this process, the region which the cursor 130 does not reach can be generated on the large screen display 20.

Figure 5:
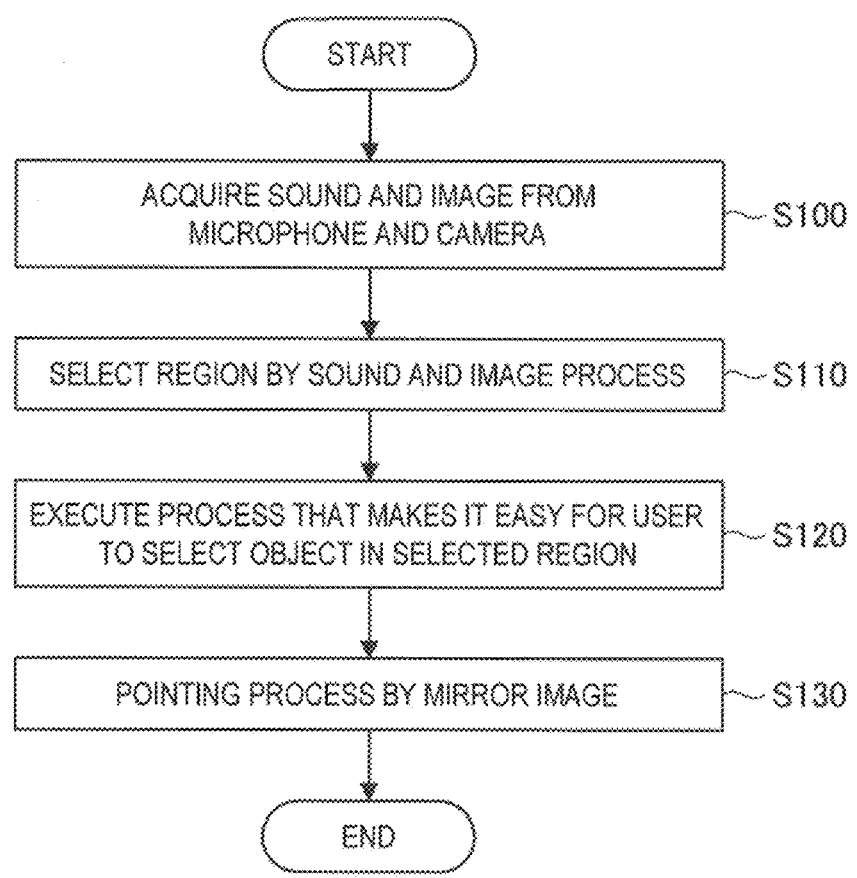
FIG. 5 is a flowchart illustrating a procedure of a process by the image processing system.

In this way, in the above method, "being able to select the entire screen" and "being able to select minute objects" have a relationship of trade-off. Therefore, the image processing system 10 selects a part of the background image as the selected region, and adjusts the display state of at least one of the selected region and the mirror image. Thereby, the user 100 can select the entire screen, and can also select minute objects. Specifically, the image processing system 10 executes the process in accordance with the flowchart illustrated in FIG. 5.

In step S100, the control section 43 acquires the audio information and the shot image. In step S110, the control section 43 recognizes the gestural operation of the user 100 on the basis of the audio information and the shot image, and selects the selected region on the basis of the gestural operation of the user 100.

Figure 9:
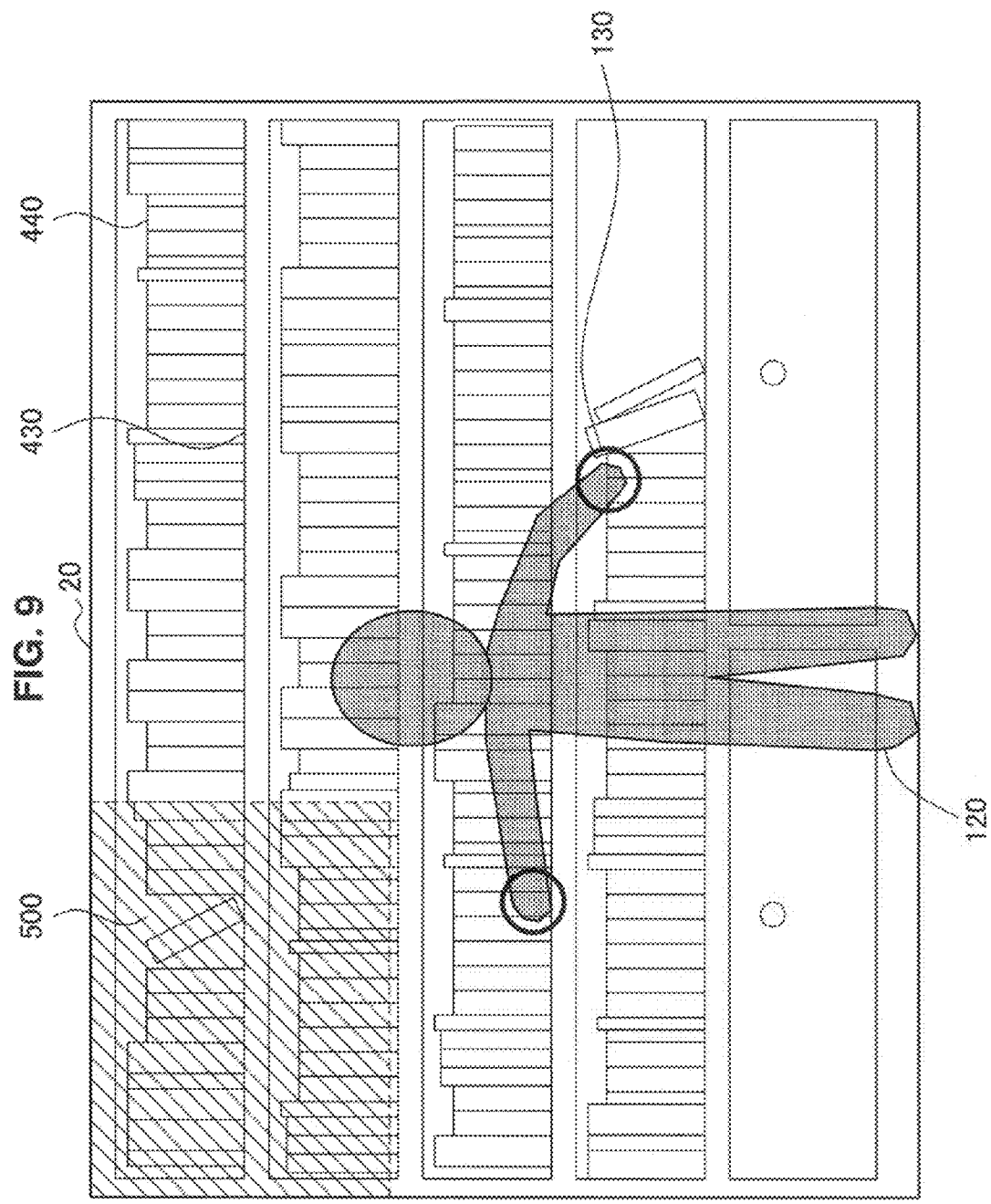
FIG. 9 is an explanatory diagram illustrating an example of a display screen image that the display device displays.

Specifically, the control section 43 detects the sight line of the user 100 as the gestural operation of the user 100. Then, the control section 43 selects the region including the intersection point of the sight line of the user 100 and the large screen display 20, as the selected region. Then, the control section 43 superimposes and displays the selected region on the superimposed image. FIG. 9 illustrates a display example. In this example, the control section 43 sets the region of the upper left of the background image as the selected region 500. To facilitate the understanding of the user 100, the selected region 500 may be displayed in highlight. For example, the selected region 500 may be displayed in a different color from the background image.

Here, as a variant example of the process to select the selected region, the following process is taken. That is, the control section 43 detects the direction of the face of the user 100 as the gestural operation of the user 100. Specifically, the control section 43 detects the face direction vector passing through the center of the face region and perpendicular to the face region. Then, the control section 43 may select the region including the intersection point of the face direction vector and the large screen display 20, as the selected region.

Also, the control section 43 displays the selected region at an arbitrary initial position on the large screen display 20, while recognizing the movement of the right hand (the palm) of the user 100 as the gestural operation of the user 100. Then, the control section 43 may move the selected region in response to the movement of the right hand of the user 100, in order to select the selected region. Note that the user 100 may select the object in the selected region with the left hand.

Also, the control section 43 may recognize the sound of the user 100 as the gestural operation of the user 100, and select the selected region on the basis of the audio information. Specifically, for example, when the user 100 states "upper right", the control section 43 may select the region of the upper right on the large screen display 20, as the selected region.

In addition, the control section 43 may select the selected region on the basis of all sorts of gestural operation. For example, the control section 43 recognizes that the user 100 stretches himself or herself upward, as the gestural operation of the user 100. Then, the control section 43 selects the upper side region of the large screen display 20 as the selected region. This is because the user 100 is assumed to be considering selecting the object displayed on the upper side region of the large screen display 20.

Also, the control section 43 recognizes that the user 100 crouches down, as the gestural operation of the user 100. Then, the control section 43 selects the lower side region of the large screen display 20 as the selected region. This is because the user 100 is assumed to be considering selecting the object displayed on the lower side region of the large screen display 20. Also, the control section 43 may detect the region which the cursor 130 does not reach, and automatically set this region as the selected region.

Also, the control section 43 may change the size of the selected region 500 on the basis of the gestural operation of the user 100. For example, when the user 100 puts the both palms one on the other in the vertical direction, and after that, separates the both palms from each other, the control section 43 may enlarge the selected region 500 in the vertical direction. Also, when the user 100 brings the both palms close to each other, the control section 43 may make the selected region 500 smaller in the vertical direction. Further, when the user 100 puts the both palms side by side in the left-right direction, and after that, separates the both palms from each other, the control section 43 may enlarge the selected region 500 in the left-right direction. Also, when the user 100 brings the both palms close to each other, the control section 43 may make the selected region 500 smaller in the left-right direction.

In step S120, the control section 43 executes the process that makes it easy for the user 100 to select the object in the selected region. In the following, description will be made of several specific examples of this process.

Figure 10:
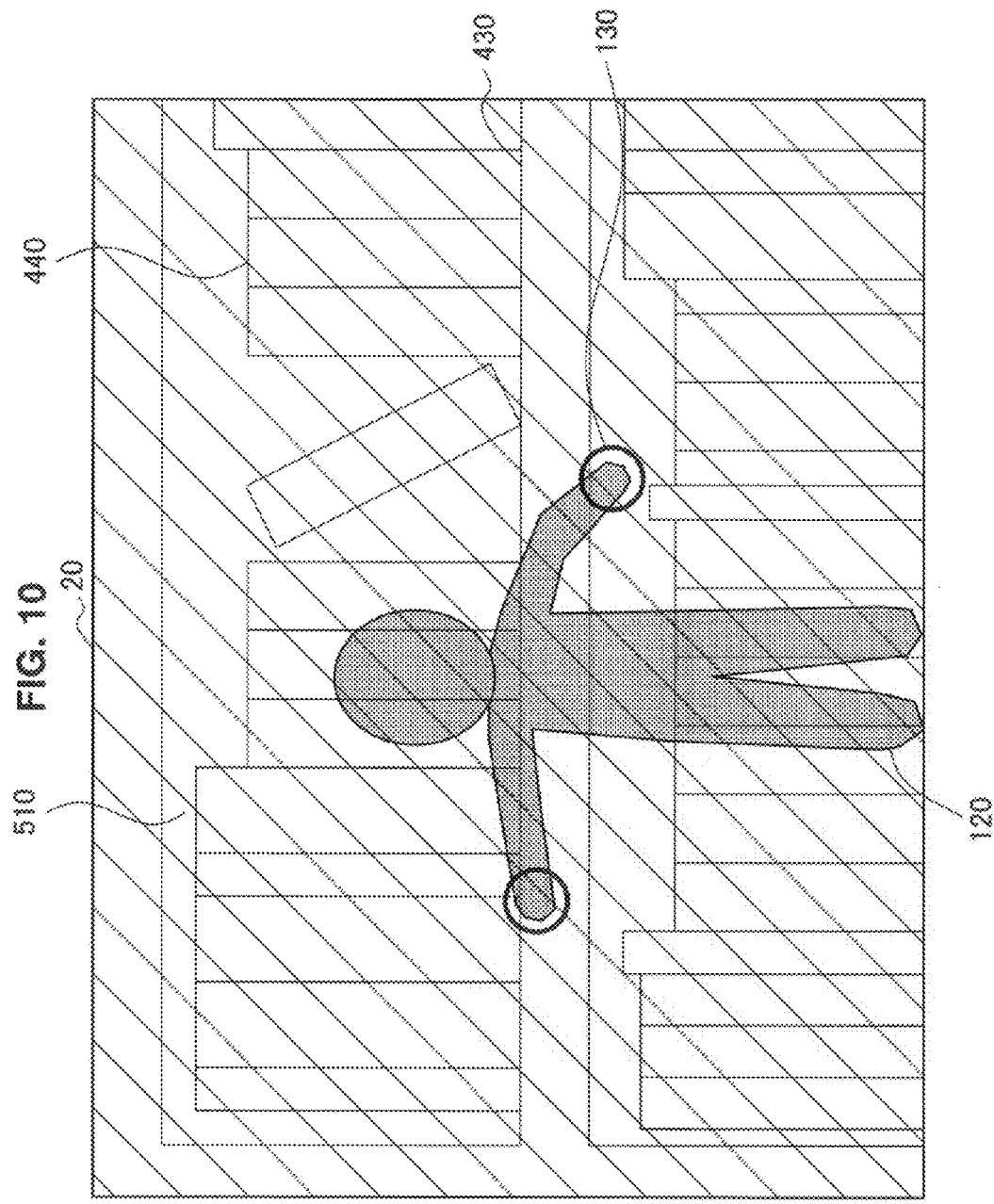
FIG. 10 is an explanatory diagram illustrating an example of a display screen image that the display device displays.

That is, the control section 43 enlarges the selected region to generate the enlarged selected region, and superimposes the mirror image on the enlarged selected region. FIG. 10 illustrates a display example. In this example, the control section 43 generates the enlarged selected region 510 by enlarging the selected region 500 of FIG. 9, and superimposes the mirror image 120 (the size of the mirror image 120 remains unchanged) on the enlarged selected region 510. Then, the control section 43 displays the superimposed image on the large screen display 20. In this example, although the enlarged selected region 510 is displayed on all the surface of the large screen display 20, the enlarged selected region 510 may be displayed on a part of the large screen display 20.

According to this example, since the enlarged selected region 510 in which the selected region 500 is enlarged is displayed, the object of the enlarged selected region 510 is also enlarged. Accordingly, the user 100 can easily select the object in the enlarged selected region 510.

Figure 11:
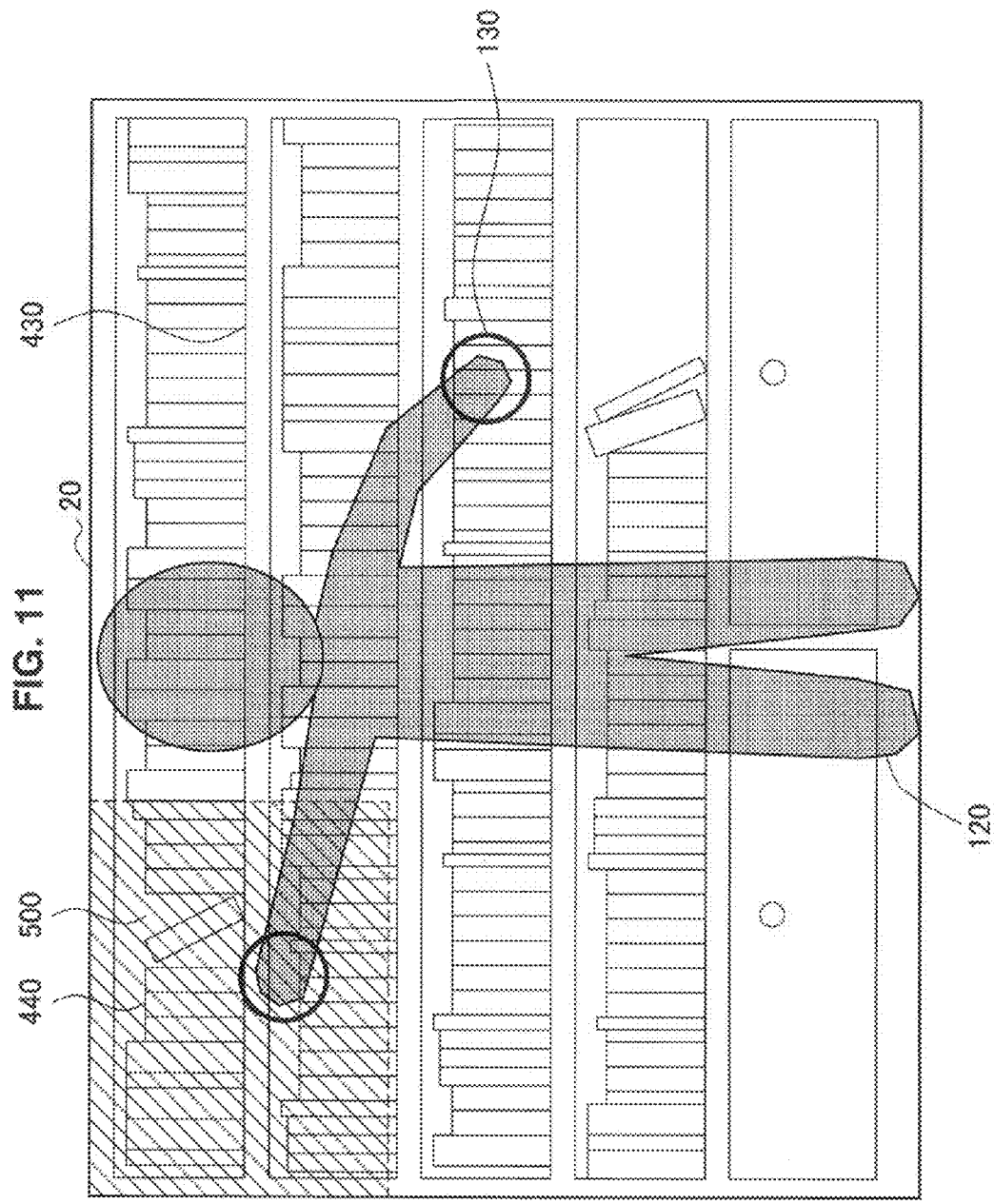
FIG. 11 is an explanatory diagram illustrating an example of a display screen image that the display device displays.

On the other hand, the control section 43 may enlarge the mirror image 120. FIG. 11 illustrates a display example. According to this example, since the palm image of the mirror image 120 reaches the selected region 500, the user 100 can easily select the object in the selected region 500.

On the other hand, the control section 43 may stretch the arm part of the mirror image 120. For example, the control section 43 extracts the human body image from the shot image, and recognizes the gestural operation of the user 100 on the basis of this human body image. Then, when the user 100 keeps fully stretching the arm, the control section 43 stretches the arm part of the mirror image 120 in the direction to which the user 100 is stretching the arm. Note that, when the user 100 performs the gestural operation of stretching the arm, the control section 43 may stretch the arm part of the mirror image 120, with the movement amount of the arm amplified by a gain. That is, in this example, the control section 43 adjusts the mirror image 120 on the basis of the gestural operation of the user 100.

Figure 12:
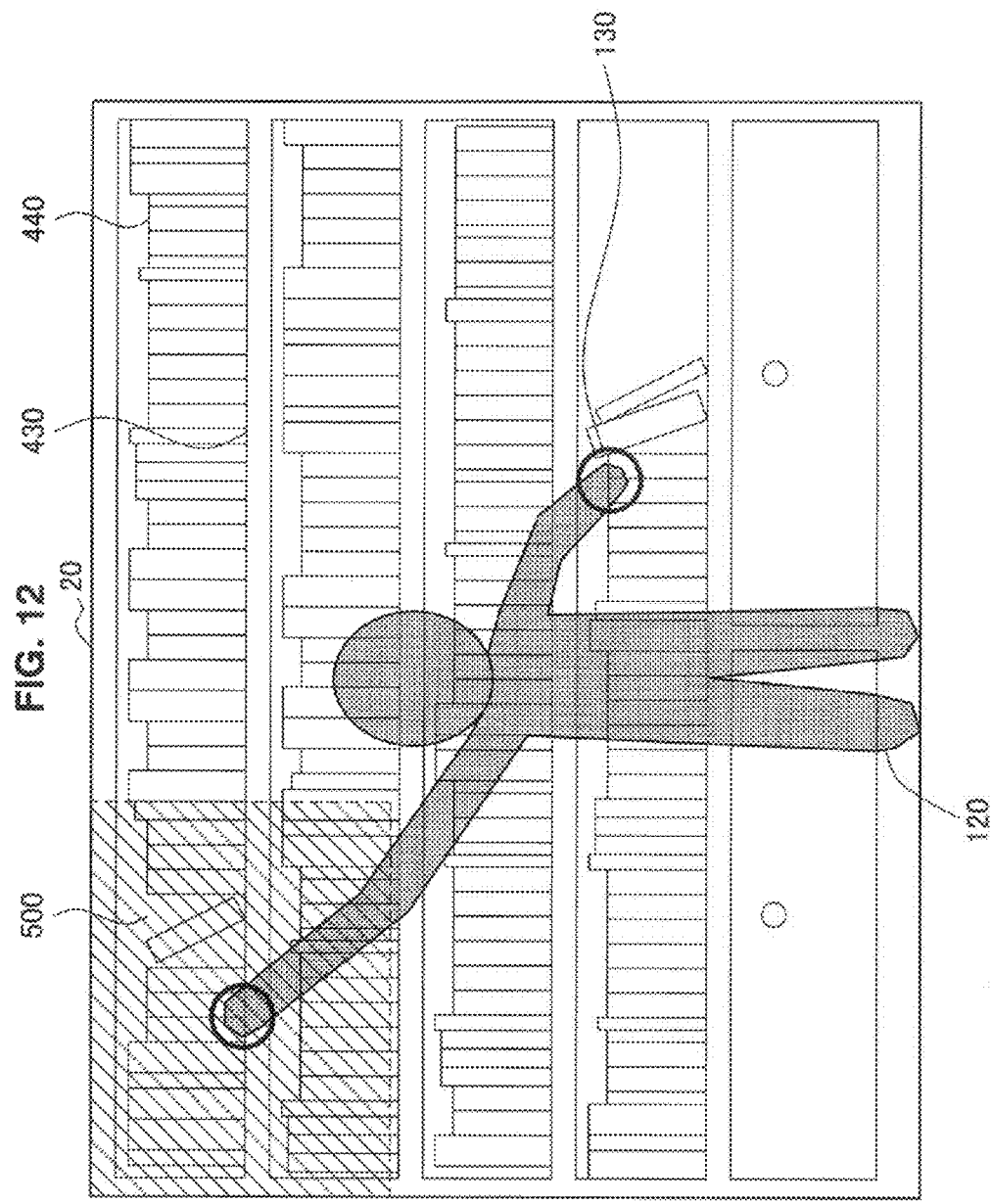
FIG. 12 is an explanatory diagram illustrating an example of a display screen image that the display device displays.

FIG. 12 illustrates a display example. In this example, the arm part of the mirror image 120 stretches to the selected region 500. According to this example, the user 100 can easily select the object in the selected region 500.

Figure 13:
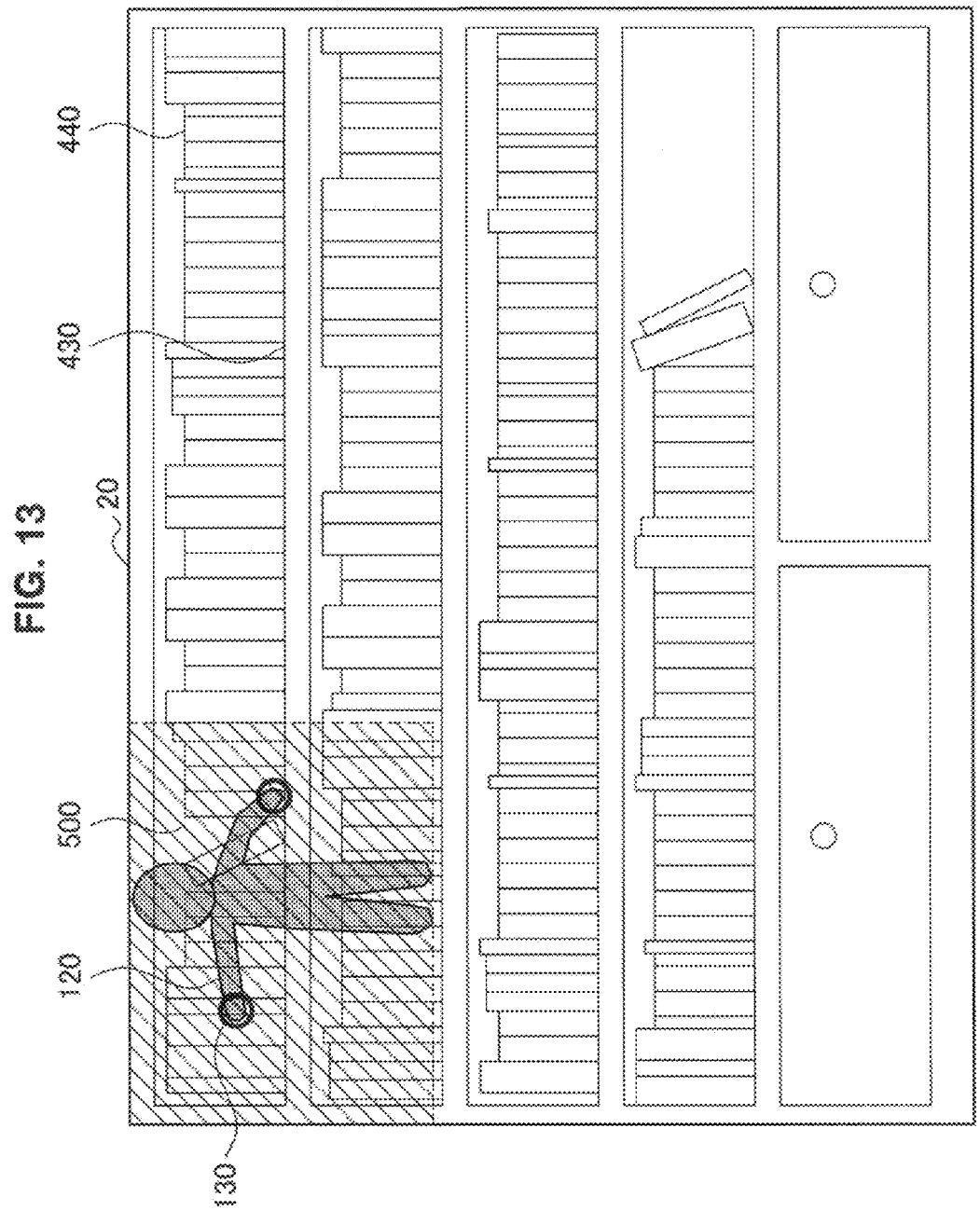
FIG. 13 is an explanatory diagram illustrating an example of a display screen image that the display device displays.

On the other hand, the control section 43 may locate the mirror image 120 in the selected region 500. When the mirror image 120 is bigger than the selected region 500, the control section 43 makes the mirror image 120 smaller, and thereafter locates the mirror image 120 in the selected region 500. FIG. 13 illustrates a display example. According to this example, since the mirror image 120 is located in the selected region 500, the user 100 can easily select the object in the selected region 500.

Figure 14:
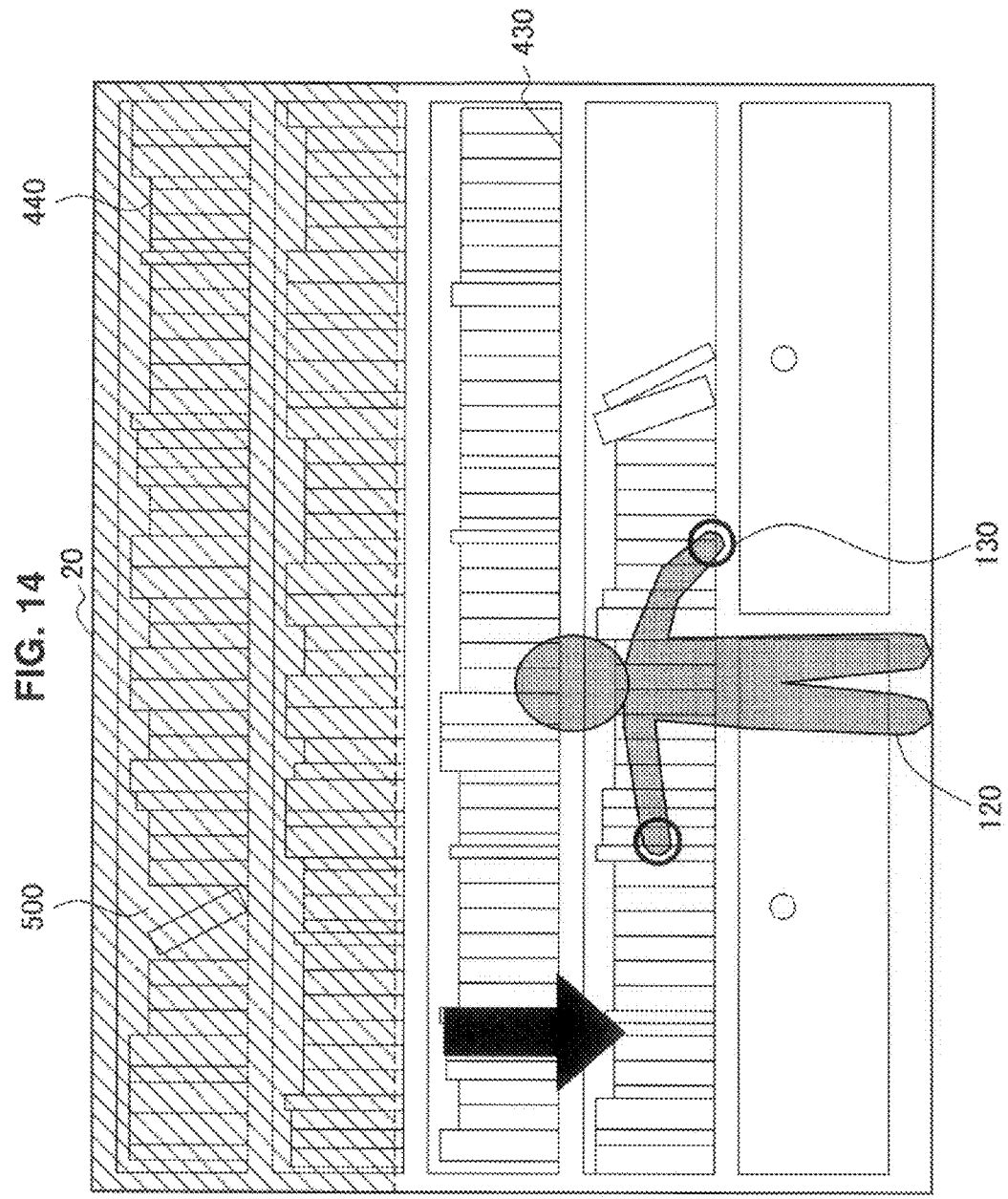
FIG. 14 is an explanatory diagram illustrating an example of a display screen image that the display device displays.
Figure 15:
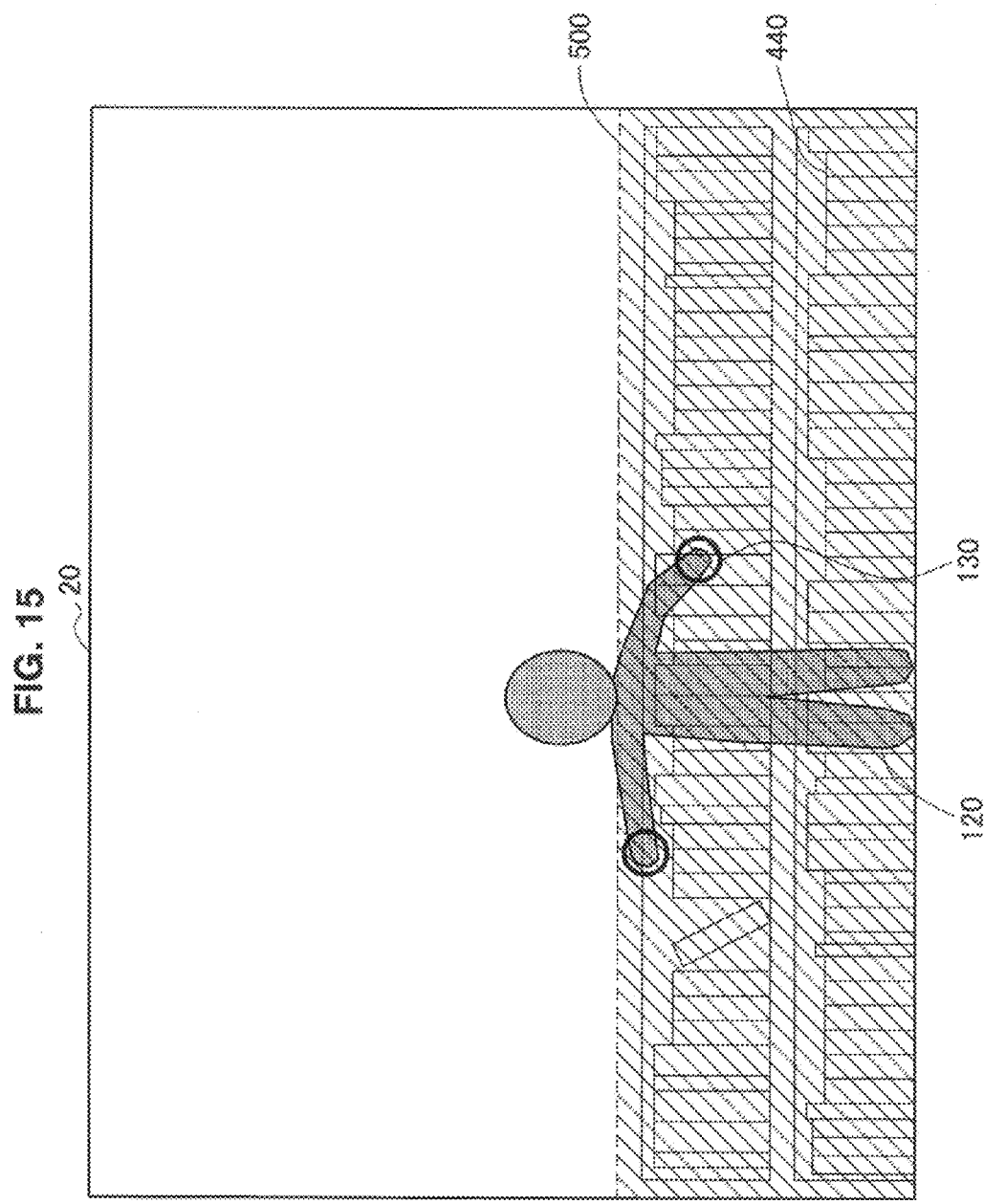
FIG. 15 is an explanatory diagram illustrating an example of a display screen image that the display device displays.

On the other hand, the control section 43 recognizes stretching upward of the user 100, as the gestural operation of the user 100. Then, the control section 43 selects the upper side region of the large screen display 20 as the selected region. Then, the control section 43 moves the selected region downward. FIG. 14 and FIG. 15 illustrate a display example. As illustrated in FIG. 14, when the user 100 stretches himself or herself upward, the control section 43 selects the upper side region of the large screen display 20 as the selected region 500. Note that, as illustrated in FIG. 14, in this example, the user 100 is relatively short in height. That is, the user 100 is a child, for example. Accordingly, the mirror image 120 is also small. Accordingly, since it is supposed that the user 100 often stretches himself or herself upward, the present example is a preferable process. Then, as illustrated in FIG. 15, the control section 43 moves the selected region 500 downward. Preferably, the control section 43 moves the selected region 500 until the selected region 500 overlaps the mirror image 120. Thereby, the user 100 can easily select the object in the selected region 500. That is, in this example, the control section 43 adjusts the mirror image 120 on the basis of the gestural operation of the user 100.

On the other hand, the control section 43 recognizes crouching down of the user 100, as the gestural operation of the user 100. Then, the control section 43 selects the lower side region of the large screen display 20 as the selected region. Then, the control section 43 moves the selected region upward. This example is especially preferable when the user 100 is relatively tall. This is because it is supposed that the user 100 often crouches down in this case. In this example as well, the user 100 can easily select the object in the selected region 500. That is, in this example, the control section 43 adjusts the mirror image 120 on the basis of the gestural operation of the user 100.

Note that, in each example above, the control section 43 may set the moving speed of the palm image of the mirror image in the selected region 500 smaller than the moving speed of the palm of the user 100. Thereby, the user 100 can select the object in the selected region 500 more accurately. Also, the control section 43 may adjust the moving speed of the palm image in response to the number or the like of the objects in the selected region 500. For example, the control section 43 may set the moving speed of the palm image, in such a manner that the more the number of the object in the selected region 500 is, the slower the moving speed of the palm image is. Thereby, the user 100 can select a minute object more accurately.

Also, for example, when the user 100 performs the gestural operation of lifting the left foot, the control section 43 may scroll the entire screen image to the left. Likewise, for example, when the user 100 performs the gestural operation of lifting the right foot, the control section 43 may scroll the entire screen image to the right. Thereby, when the user 100 does not find a target object in the bookshelf 430, the user 100 can find the target object from another bookshelf.

On the other hand, the control section 43 may identify the object in the selected region on the basis of the audio information of the user 100. For example, when the user 100 states the title of the book 440, the control section 43 selects the book 440 having the title from the selected region 500. Also, when the object is a CD, and the user 100 states "play this", the control section 43 may execute the process to play the CD.

Note that, by performing a preset gestural operation for cancellation, the user 100 can cancel each adjustment process (the process to adjust at least one of the mirror image 120 and the selected region 500) described above. As the gestural operation for cancellation, producing a sound stating "cancel", averting the sight line (or the direction of the face) from the selected region, clapping hands, and the like are considered, for example.

Accordingly, the control section 43 selects a part of the background image as the selected region 500, and executes the process that makes it easy for the user 100 to select the object in the selected region 500. Thereby, the user 100 can select the object from the entire region in the large screen display 20, and select the minute object. That is, the user 100 can select a target object on the large screen display 20 as well, without effort (need not move left and right, can reach always, need not get close to the screen immoderately). Also, the user 100 can select a target object accurately (need not move the hand little by little) and intuitively (can select an object on the sight just by looking, and the like).

In step S130, the control section 43 executes the pointing process by the mirror image, specifically the process illustrated in FIG. 4.

Figure 16:
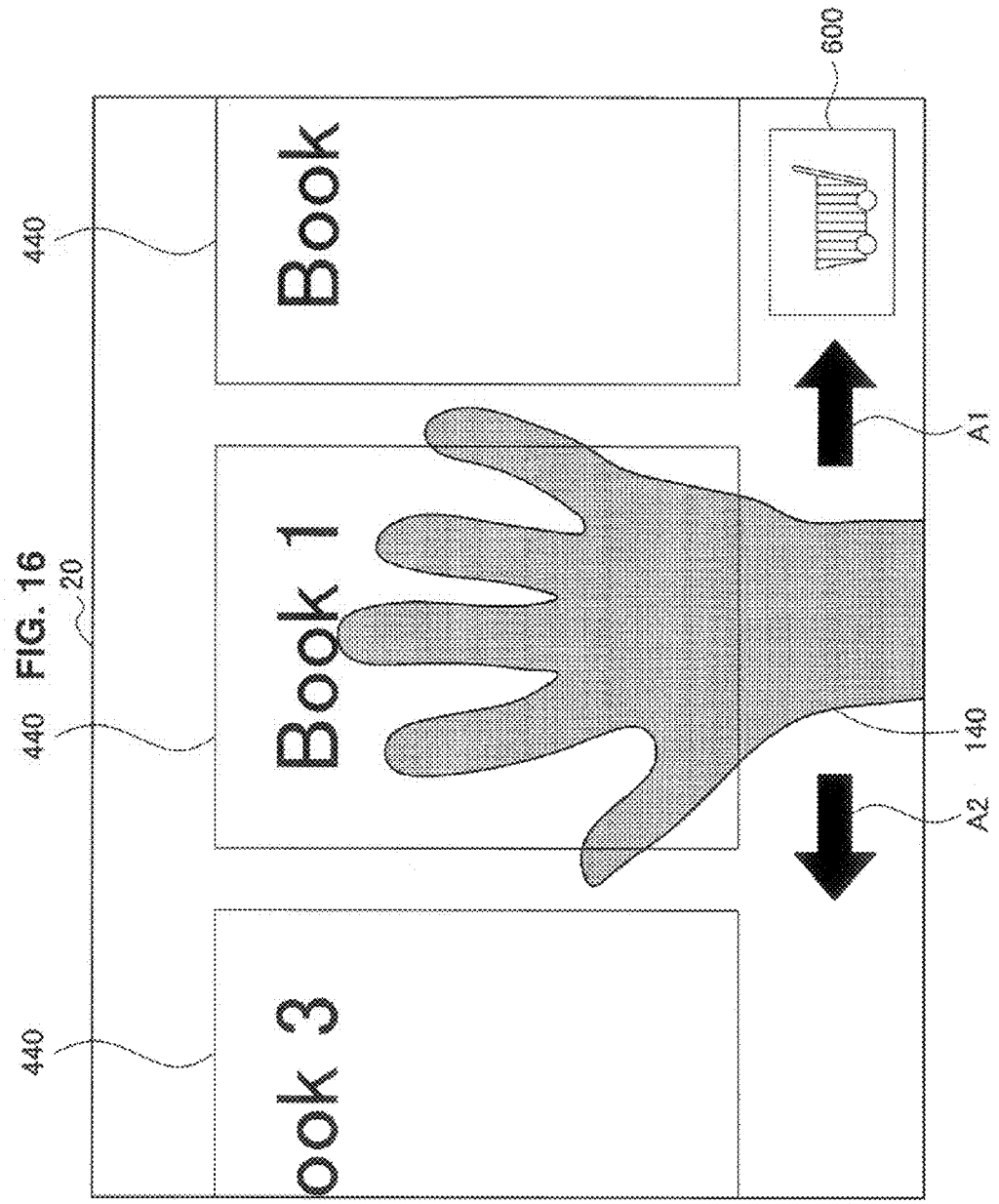
FIG. 16 is an explanatory diagram illustrating an example of a display screen image that the display device displays.
Figure 17:
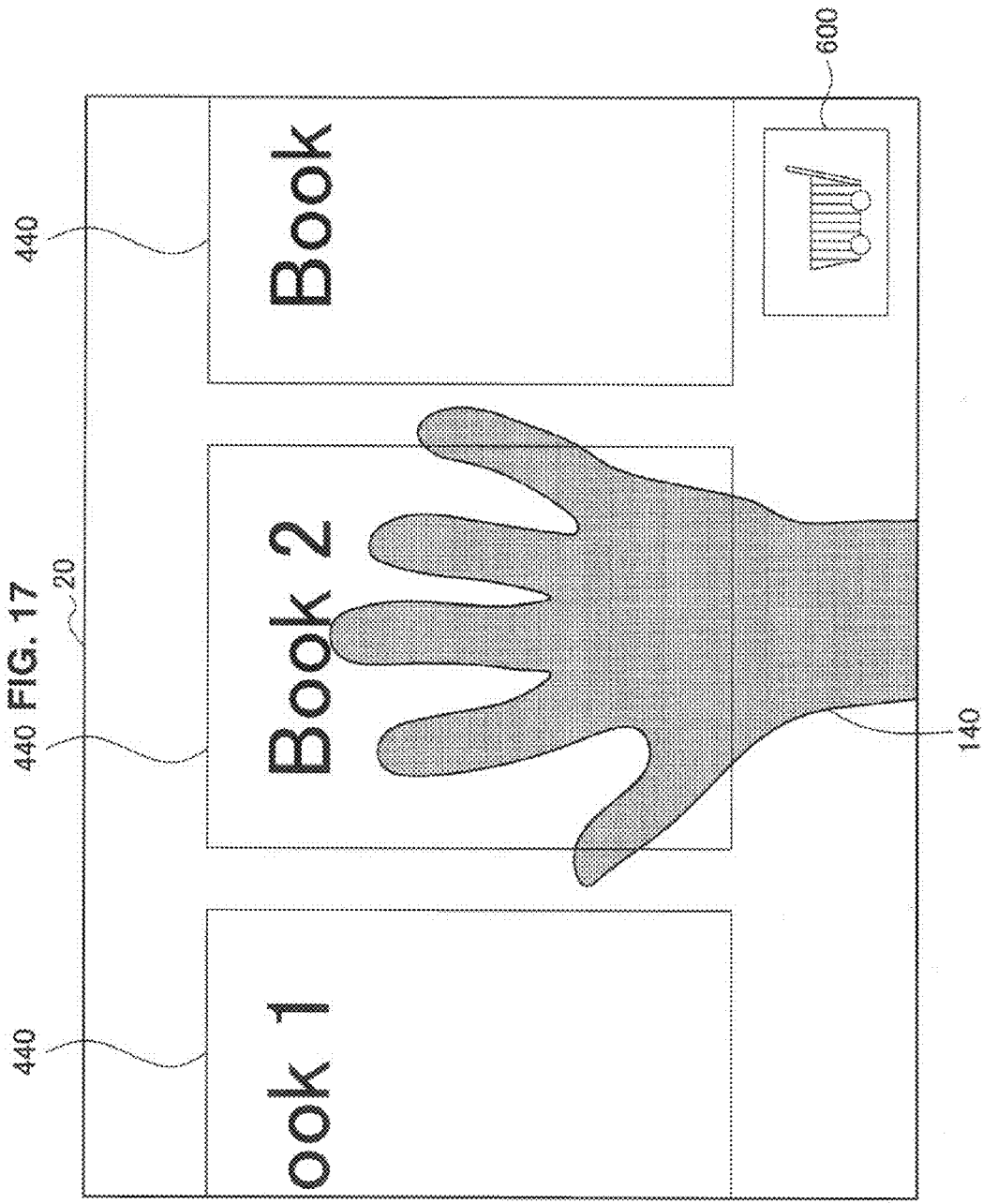
FIG. 17 is an explanatory diagram illustrating an example of a display screen image that the display device displays.

Next, description will be made of the detail selection process, on the basis of FIG. 16 to FIG. 18. The control section 43 executes the detail selection process, when the user 100 selects any object (performs the gesture of holding an object, with the cursor 130 overlapped on the object). First, as illustrated in FIG. 16, the control section 43 displays the object that the user 100 has selected and the adjacent books 440 in such a manner to arrange them side by side. The control section 43 locates the book 440 that the user 100 has selected at the center of the large screen display 20. In this example, "Book 1" is located at the center. Further, the control section 43 cuts out the palm image 140 from the mirror image 120, and displays the palm image 140 in an enlarged manner. Further, the control section 43 displays the cart icon 600 as well.

Then, when the palm of the user 100 is in the state of "paper" and is moved rightward, the control section 43 moves the palm image 140 in the arrow A1 direction (rightward), and scrolls the row of the books 440 in the arrow A1 direction (rightward). The scroll amount is one volume of the book 440. Thereby, "Book 3" is newly located at the center.

On the other hand, when the palm of the user 100 is in the state of "paper" and is moved leftward, the control section 43 moves the palm image 140 in the arrow A2 direction (leftward), and scrolls the row of the books 440 in the arrow A2 direction (leftward). The scroll amount is one volume of the book 440. Thereby, as illustrated in FIG. 17, the control section 43 displays "Book 2" located at the right side of "Book 1", at the center of the large screen display 20. The control section 43 executes this process, in order to allow the user 100 to conduct more detailed object selection. Thereby, even when the user 100 selects a book 440 different from the target book 440 by mistake, the user 100 can select the target book 440 in the detail selection process.

Figure 18:
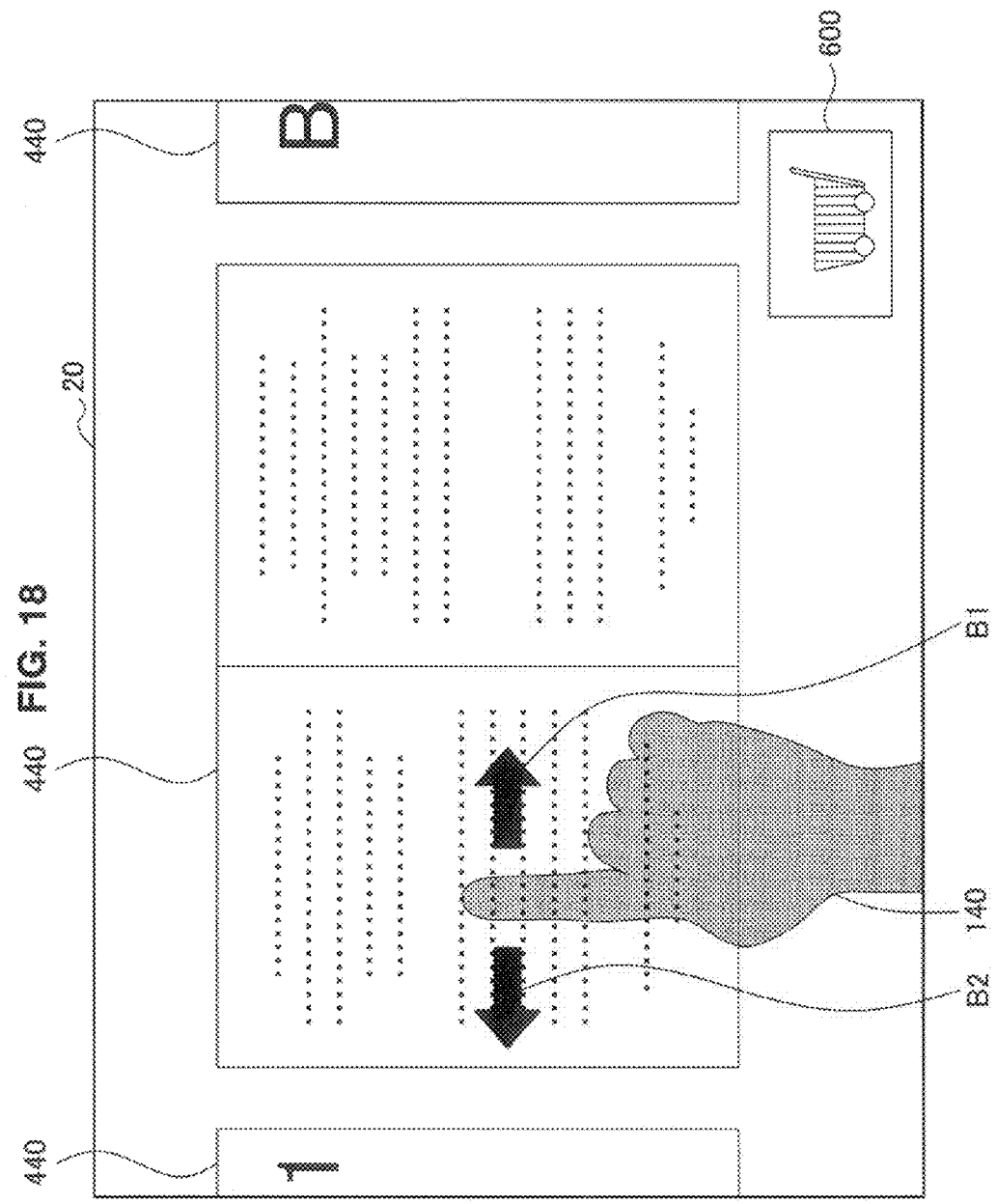
FIG. 18 is an explanatory diagram illustrating an example of a display screen image that the display device displays.

On the other hand, when the palm of the user 100 is in the state in which only the index finger is stretched out and is moved rightward, the control section 43 moves the palm image 140 in the arrow B1 direction (rightward), and turns one page of the book 440 rightward, as illustrated in FIG. 18. On the other hand, when the palm of the user 100 is in the state in which only the index finger is stretched out and is moved leftward, the control section 43 moves the palm image 140 in the arrow B2 direction (leftward), and turns one page of the book 440 leftward. The control section 43 executes this process, in order to allow the user 100 to read the book 440 before buying. Thereby, the user 100 can purchase the book 440 after confirming the contents of the book 440.

When the palm of the user 100 is in the state of "paper" and the palm image 140 overlaps the cart icon 600, the control section 43 puts the book 440 located at the center, in the cart.

After that, when the user 100 produces a sound stating "cancel" or performs the preset gestural operation for cancellation, the control section 43 displays the normal store image on the large screen display 20, as illustrated in FIG. 7. Then, the control section 43 scrolls the normal store image on the basis of the gestural operation of the user 100. The specific process content is as described above.

Figure 19:
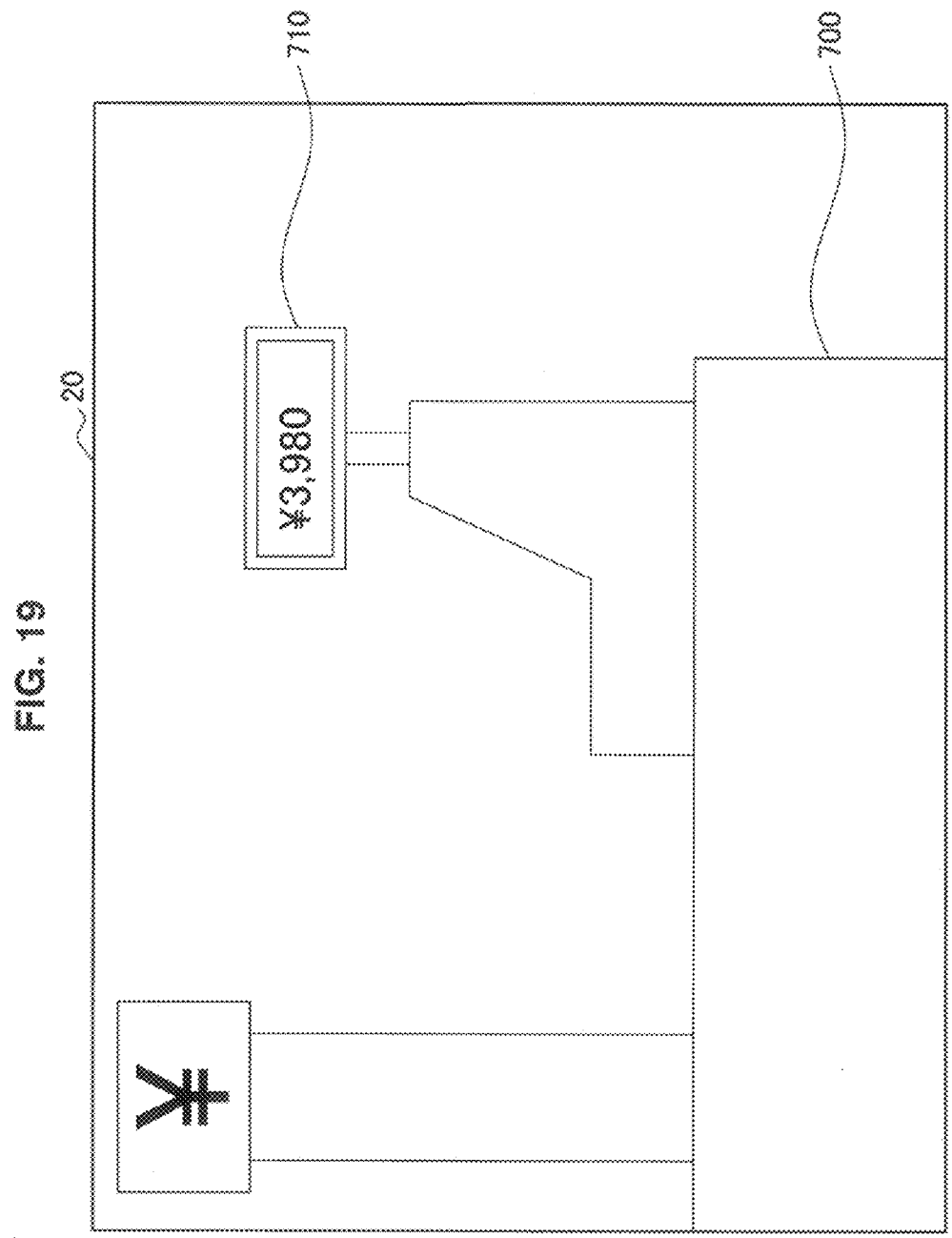
FIG. 19 is an explanatory diagram illustrating an example of a display screen image that the display device displays.

Then, when the control section 43 displays the cash register 700 illustrated in FIG. 19 (i.e., the user 100 reaches the cash register 700), the control section 43 executes the payment process (for example, the withdrawal from the credit card). Also, the control section 43 displays the purchase amount on the payment display window 710 of the cash register 700. By the above, the control section 43 ends the process relevant to the virtual shopping.

Figure 20:
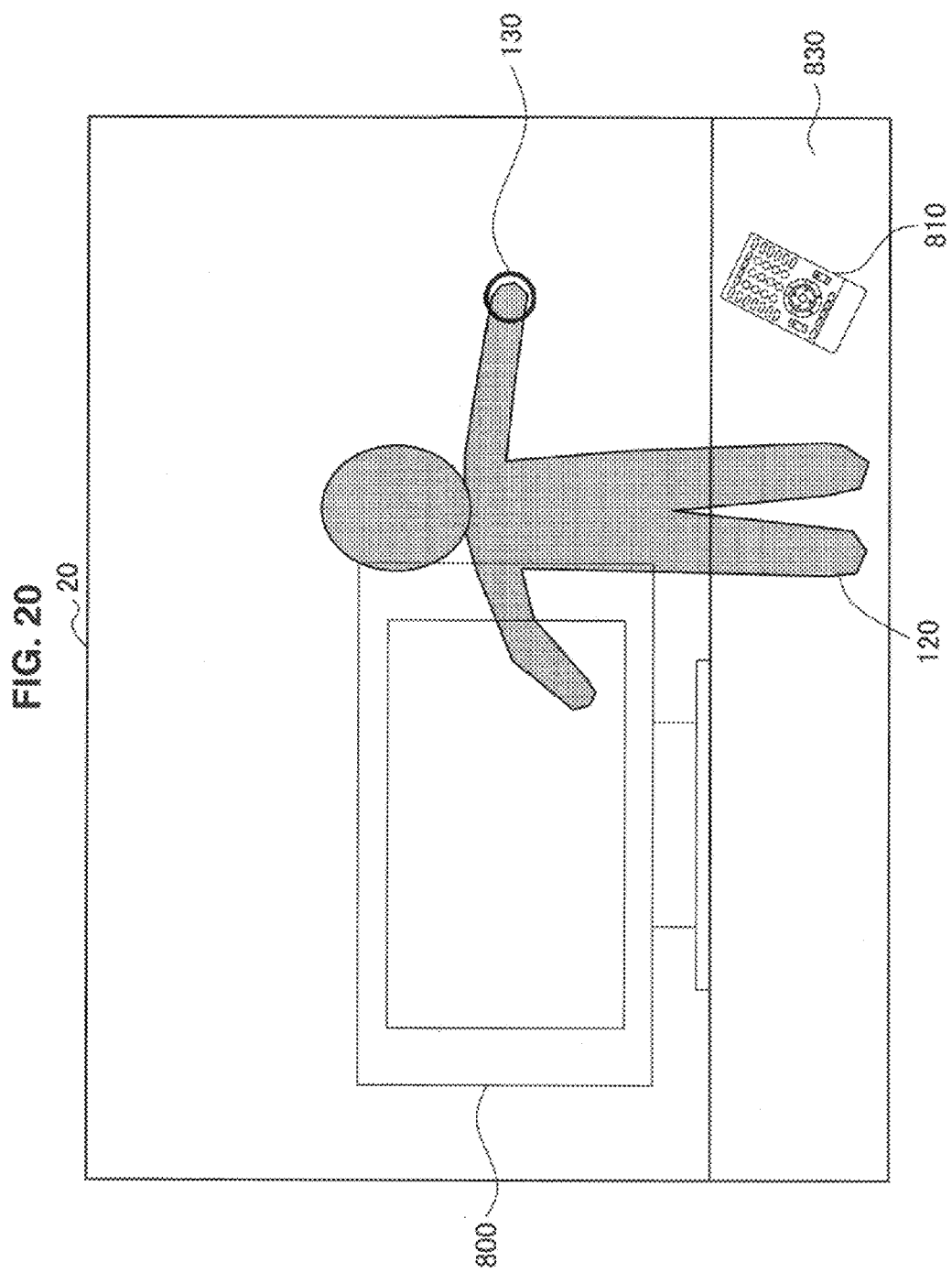
FIG. 20 is an explanatory diagram illustrating an example of a display screen image that the display device displays.
Figure 21:
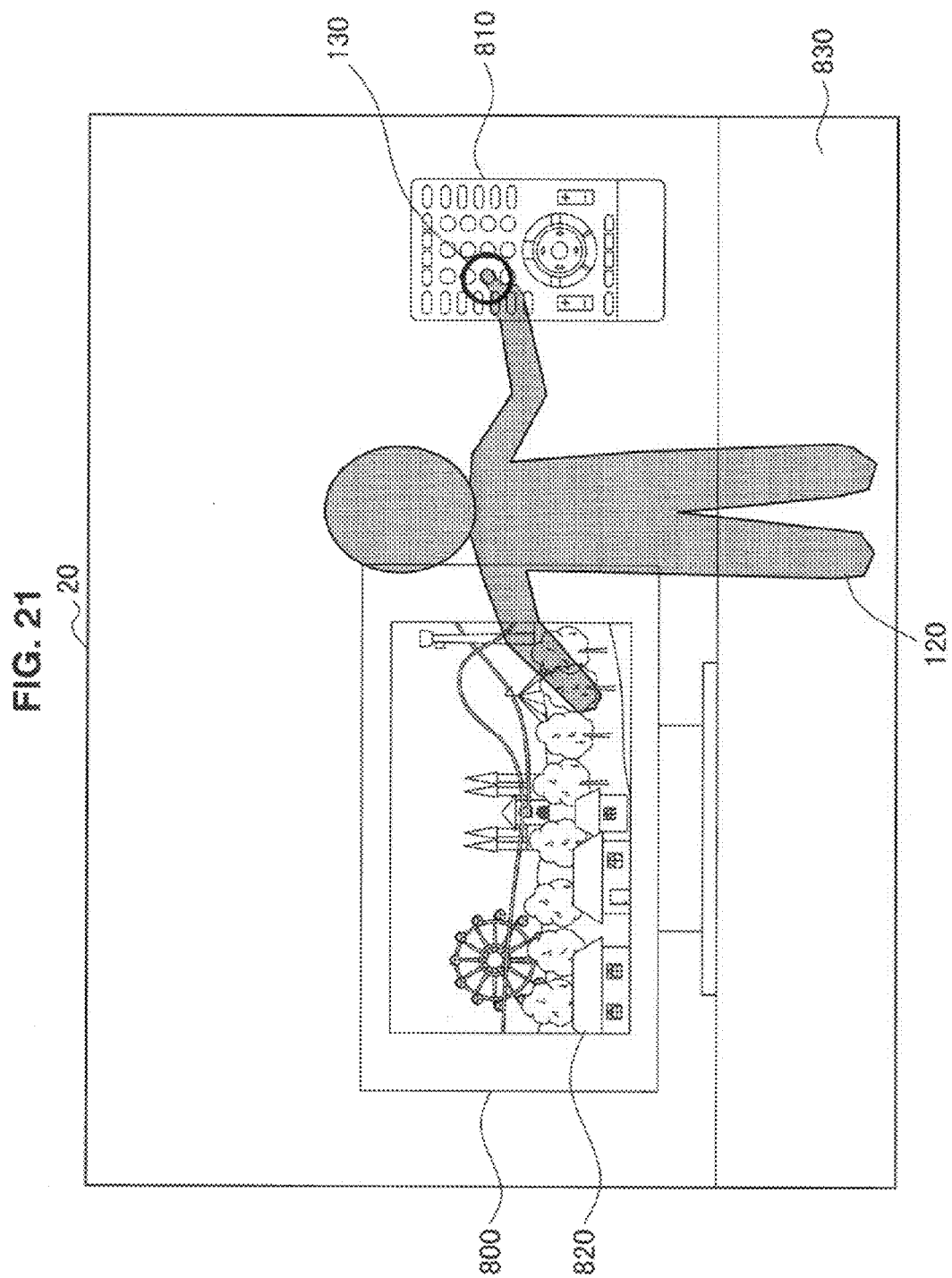
FIG. 21 is an explanatory diagram illustrating an example of a display screen image that the display device displays.

Note that, as a matter of course, the store may be other than the book store. For example, the store may be a record shop, a supermarket, a department store, and others. Also, the background image may be other than the background image of the store. An example other than the store is illustrated in FIG. 20 to FIG. 21.

In this example, the control section 43 displays the living room image on the large screen display 20, as the background image. In this living room image, the display 800, the remote control 810, and the ground surface 830 are depicted. That is, in this example, what is called the display on display (the illusionary display 800 is displayed in the large screen display 20) is implemented. The ground surface 830 is located on the same plane as the floor of the room 200. Accordingly, the user 100 has a sense that there is another living room next to the room 200. Also, the control section 43 superimposes the mirror image 120 and the cursor 130, which are described above, on the background image.

In this example as well, the control section 43 can execute the process described above, with regard to the background image and the mirror image 120. Also, when the palm of the user 100 becomes "paper", and the cursor 130 overlaps the remote control 810, the control section 43 causes the cursor 130 to follow the remote control 810. Further, when the palm of the user 100 comes to a state in which only the index finger is stretched out, the control section 43 enlarges the remote control 810, as illustrated in FIG. 21. Then, the control section 43 detects the button that the user 100 has selected (i.e., the button that the index finger part of the mirror image 120 has overlapped). Then, the control section 43 displays the screen image 820 corresponding to the button that the user 100 has selected, on the display 800.

By the above, in the present embodiment, the image processing system 10 superimposes the mirror image 120 on the background image to generate the superimposed image, and displays the superimposed image on the large screen display 20, while adjusting the display state of the superimposed image. Thereby, the image processing system 10 can improve the operability of the mirror image 120. Specifically, the image processing system 10 can allow the user 100 to select the entire region of the large screen display 20, and to select a minute object.

Also, the image processing system 10 adjusts the display state of at least one of the mirror image 120 and the background image. Accordingly, the image processing system 10 can improve the operability of the mirror image 120.

Further, the image processing system 10 selects a part of the background image as the selected region 500, and adjusts the display state of at least one of the selected region 500 and the mirror image 120. Accordingly, the image processing system 10 can improve the operability of the mirror image 120.

Further, the image processing system 10 selects the selected region 500 on the basis of the gestural operation of the user 100, so that the user 100 can easily select the target region.

Further, the image processing system 10 adjusts the display state of at least one of the selected region 500 and the mirror image 120, on the basis of the gestural operation of the user 100, so as to further improve the operability of the mirror image 120.

Further, the image processing system 10 enlarges the selected region 500 to generate the enlarged selected region 510, and superimposes the mirror image 120 on the enlarged selected region 510. Accordingly, the user 100 can easily select the object in the selected region.

Further, the image processing system 10 enlarges the mirror image 120, so that the user 100 can easily select the object in the selected region 500.

Further, the image processing system 10 stretches the arm image that makes up the mirror image 120, to the selected region 500, so that the user 100 can easily select the object in the selected region 500.

Further, the image processing system 10 locates the mirror image 120 in the selected region 500, so that the user 100 can easily select the object in the selected region 500.

The preferred embodiments of the present invention have been described above with reference to the accompanying drawings, whilst the present invention is not limited to the above examples, of course. A person skilled in the art may find various alterations and modifications within the scope of the appended claims, and it should be understood that they will naturally come under the technical scope of the present invention.

For example, the above embodiment illustrates an example in which the image of the inside of the store or the living room image is displayed on the large screen display 20, but as a matter of course, other images may be displayed on the large screen display 20. Also, the present embodiment is applicable to the displays that is smaller than the large screen display 20, for example, the displays of about several ten inches.

Additionally, the present technology may also be configured as below.

(1)

An image processing device including:

a control section configured to execute control to generate a superimposed image by superimposing on a background image a human body image that depicts at least a part of a human body and moves in response to gestural operation of a user, in order to display the superimposed image, while adjusting a display state of the superimposed image.

(2)

The image processing device according to (1), wherein the control section adjusts a display state of at least one of the human body image and the background image.

(3)

The image processing device according to (2), wherein the control section selects a part of the background image as a selected region, and adjusts a display state of at least one of the selected region and the human body image.

(4)

The image processing device according to (3), wherein the control section selects the selected region on the basis of the gestural operation of the user.

(5)

The image processing device according to (3) or (4), wherein the control section adjusts the display state of at least one of the selected region and the human body image, on the basis of the gestural operation of the user.

(6)

The image processing device according to any one of (3) to (5), wherein the control section generates an enlarged selected region by enlarging the selected region, and superimposes the human body image on the enlarged selected region.

(7)

The image processing device according to any one of (3) to (5), wherein the control section enlarges the human body image.

(8)

The image processing device according to any one of (3) to (5), wherein the control section stretches an arm image that makes up the human body image, to the selected region.

(9)

The image processing device according to any one of (3) to (5), wherein the control section locates the human body image in the selected region.

(10)

An image processing method including:

executing control to generate a superimposed image by superimposing on a background image a human body image that depicts at least a part of a human body and moves in response to gestural operation of a user, in order to display the superimposed image, while adjusting the superimposed image.

(11)

A program for causing a computer to implement a control function to execute control to generate a superimposed image by superimposing on a background image a human body image that depicts at least a part of a human body and moves in response to gestural operation of a user, in order to display the superimposed image, while adjusting the superimposed image.

REFERENCE SIGNS LIST 10 image processing system
20 large screen display
30 communication network
40 server
120 mirror image
410, 420 background image
430 bookshelf
500 selected region

The invention claimed is:

1. An image processing device comprising:
a control section configured to execute control to generate a superimposed image by superimposing on a background image a semi-transparent mirror human body image that is generated according to a captured image of a user and that depicts at least a part of a human body, in order to display the superimposed image, the background image and the semi-transparent mirror human body image are movable in response to a number of gestural operations of the user while adjusting a display state of the superimposed image;
the control section configured to, in response to a crouching gestural operation of the user, select a low portion of the background image as a selected region and move the selected region upward so as to facilitate recognition of the selected region thereof by the user and so as to overlap with the semi-transparent mirror human body image; and
the control section configured to scroll the background image in a screen depth direction when the user stamps his or her feet.

2. The image processing device according to claim 1, wherein the control section adjusts a display state of at least one of the semi-transparent mirror human body image and the background image.

3. The image processing device according to claim 2, wherein the control section is configured to adjust a display state of the semi-transparent minor human body image.

4. The image processing device according to claim 2, wherein the control section is configured to enlarge the selected region, and superimposes the semi-transparent mirror human body image on the enlarged selected region.

5. The image processing device according to claim 2, wherein the control section is configured to enlarge the semi-transparent mirror human body image.

6. The image processing device according to claim 2, wherein the control section is configured to stretch an arm image that makes up the semi-transparent mirror human body image, to the selected region.

7. The image processing device according to claim 2, wherein the control section is configured to locate the semi-transparent mirror human body image in the selected region.

8. An image processing method comprising:
executing control to generate a superimposed image by superimposing on a background image a semi-transparent mirror human body image that is generated according to a captured image of a user and that depicts at least a part of a human body, in order to display the superimposed image, the background image and the semi-transparent mirror human body image are movable in response to a number of gestural operations of the user while adjusting a display state of the superimposed image;
in response to a crouching gestural operation of the user, selecting a low portion of the background image as a selected region and moving the selected region upward so as to facilitate recognition of the selected region thereof by the user and so as to overlap with the semi-transparent mirror human body image; and
scrolling the background image in a screen depth direction when the user stamps his or her feet.

9. A non-transitory computer readable medium having stored thereon a program which when executed by a computer causes the computer to implement a control method comprising:

executing control to generate a superimposed image by superimposing on a background image a semi-transparent mirror human body image that is generated according to a captured image of a user and that depicts at least a part of a human body, in order to display the superimposed image, the background image and the semi-transparent mirror human body image are movable in response to a number of gestural operations of the user while adjusting a display state of the superimposed image;

in response to a crouching gestural operation of the user, selecting a low portion of the background image as a selected region and moving the selected region upward so as to facilitate recognition of the selected region thereof by the user and so as to overlap with the semi-transparent mirror human body image; and scrolling the background image in a screen depth direction when the user stamps his or her feet.

* * * * *